United States Patent
Trzaskus et al.

(10) Patent No.: US 12,296,304 B2
(45) Date of Patent: May 13, 2025

(54) MEMBRANE FOR WATER FILTRATION

(71) Applicant: AQUAPORIN A/S, Kongens Lyngby (DK)

(72) Inventors: Krzysztof Trzaskus, Kgs. Lyngby (DK); Reyhan Sengur-Tasdemir, Holte (DK)

(73) Assignee: AQUAPORIN A/S, Kongens Lyngby (DK)

( * ) Notice: Subject to any disclaimer, the term of this patent is extended or adjusted under 35 U.S.C. 154(b) by 0 days.

(21) Appl. No.: 18/259,432

(22) PCT Filed: Jan. 12, 2022

(86) PCT No.: PCT/EP2022/050538
§ 371 (c)(1),
(2) Date: Jun. 28, 2023

(87) PCT Pub. No.: WO2022/152748
PCT Pub. Date: Jul. 21, 2022

(65) Prior Publication Data
US 2024/0058768 A1   Feb. 22, 2024

(30) Foreign Application Priority Data
Jan. 13, 2021   (DK) .............................. PA202170016

(51) Int. Cl.
*B01D 69/12* (2006.01)
*B01D 63/02* (2006.01)
*B01D 63/10* (2006.01)
*B01D 69/14* (2006.01)
*B01D 71/56* (2006.01)

(52) U.S. Cl.
CPC ..... *B01D 69/1251* (2022.08); *B01D 63/0233* (2022.08); *B01D 63/101* (2022.08); *B01D 69/144* (2013.01); *B01D 71/56* (2013.01); *B01D 2323/219* (2022.08); *B01D 2323/40* (2013.01)

(58) Field of Classification Search
CPC .............. B01D 69/1251; B01D 69/144; B01D 63/0233; B01D 63/101; B01D 71/56; B01D 2323/219; B01D 2323/40; B01D 2323/36; B01D 67/0006; Y02A 20/131
See application file for complete search history.

(56) References Cited

U.S. PATENT DOCUMENTS

| | | | |
|---|---|---|---|
| 6,337,018 B1 | 1/2002 | Mickols | |
| 6,878,278 B2 * | 4/2005 | Mickols | ................ B01D 71/56 210/490 |
| 2017/0182467 A1 * | 6/2017 | Paul | ................... B01D 69/1251 |

FOREIGN PATENT DOCUMENTS

| | | | | |
|---|---|---|---|---|
| WO | WO-2014108827 A1 * | 7/2014 | ........... | B01D 61/002 |
| WO | WO-2015167759 A1 * | 11/2015 | ......... | B01D 67/0093 |
| WO | WO-2015175258 A1 * | 11/2015 | ......... | B01D 67/0006 |
| WO | WO-2018141985 A1 * | 8/2018 | ........... | B01D 61/002 |

OTHER PUBLICATIONS

European Patent Office, International Search Report, International Application No. PCT/EP/20222/050538, dated Mar. 14, 2022, 3 pages.
International Preliminary Examining Authority, Patent Cooperation Treaty, International Preliminary Report on Patentability, PCT/EP/2022/050538, dated May 3, 2023, 16 pages.

* cited by examiner

*Primary Examiner* — Bayan Salone
(74) *Attorney, Agent, or Firm* — Nordic Patent Service

(57) ABSTRACT

A process for preparing a semi-permeable membrane includes providing an aqueous phase comprising a polyfunctional amine monomer, covering a surface of a porous support membrane with the aqueous phase, applying an organic phase comprising a polyfunctional acyl halide monomer, a phosphorous containing compound and a co-solvent, and allowing the polyfunctional amine monomer and the polyfunctional acyl halide monomer to perform an interfacial polymerization reaction to form a polyamide thin film composite layer.
The presence of the co-solvent together with the phosphorous compound in the organic phase potentiates the effect of the phosphorous compound so that the water flux is increased without substantially sacrificing the salt rejection.

20 Claims, No Drawings

MEMBRANE FOR WATER FILTRATION

INTRODUCTION

The present disclosure relates to a membrane for water filtration, in particular a membrane form performing forward osmosis (FO), reverse osmosis (RO), or pressure assisted forward osmosis (PAFO). The disclosure also relates to the production of membrane for water filtration and the use of this membrane for performing a forward osmosis operation.

BACKGROUND

Reverse osmosis (RO) is generally used to treat water containing dissolved salts. An example of application of the reverse osmosis technology is using sea water or brackish water for producing desalinated potable water. In recent years forward osmosis (FO) has become increasingly popular. In a forward osmosis plant a feed is typically de-watered to concentrate the feed stream, whereas a draw solution is diluted by the water migrating across the membrane.

The membrane for RO and FO may comprise a support membrane and an active layer attached to the support membrane. Optionally, the membrane may also comprise a third layer, i.e. a bottom layer typically prepared of nonwoven polyester fibers. The active layer determines the membrane properties and performance in terms of flux, solute rejection, and fouling propensity. The active layer is typically a thin film composite (TFC) layer of polyamide. Polyamide TFC layers may be fabricated on the support membrane by interfacial polymerization between diamine in a water phase and acid chloride in an organic phase. Typically, the diamine is 1,3-phenylenediamine (MPD) and the acid chloride is 1,3,5-benzenetricarbonyl trichloride (TMC).

An efficient membrane desirably has a high water flux and a high solute rejection. However, the two properties typically are mutually exclusive as a tighter membrane with small pores needed for higher solute rejection impedes a high water flux. Therefore, extensive investigation has been focused on the development of membranes that have both a higher degree of water flux and an acceptable solute rejection.

One method to achieve high water flux is to improve monomer diffusivity by adding additives to the water phase, i.e. the diamine solution. For example, adding alcohol and ether in the water phase may led to higher permeate flux and higher salt rejection. Polyamide membranes prepared by the addition of 20 wt % isopropyl alcohol, showed a high performance with a rejection of 99.7% for 1500 ppm NaCl and water flux of more than 1.7 m$^3$/(m$^2$d) at 1.5 MPa, which is about 1.7-fold higher than that of a membrane prepared without isopropyl alcohol, see U.S. Pat. No. 5,614,099. Lin Zhao, Philip C.-Y. Chang, W.S. Winston Ho, High-flux reverse osmosis membranes incorporated with hydrophilic additives for brackish water desalination, Desalination 308 (2012) 225-232, discloses that adding hydrophilic additives to the water phase led to higher water flux and higher salt rejection. Polyamide membranes prepared by the addition of 2.85 wt % o-aminobenzoic acid with post-treatment by soaking in an aqueous solution of 5 wt % glycerol and 6 wt % CSA-TEA salt followed by drying at 90° C. for 14 min showed the best performance with a rejection of 98.8% for 2000 ppm NaCl and permeate flux of more than 2.1 m$^3$/(m$^2$d) at 1.55 MPa, which was more than twice that of a membrane prepared without hydrophilic additives. W. Xie, G. M. Geise, B. D. Freeman, H. S. Lee, G. Byun, J. E. McGrath, Polyamide interfacial composite membranes prepared from m-phenylene diamine, trimesoyl chloride and a new disulfonated diamine, J. Membr. Sci. 403-404 (2012) 152-161 reported that optimizing the concentrations between diamine and acid chloride led to higher permeate flux and higher salt rejection.

Another method to achieve higher water flux is to add additives to the organic phase. Byeong-Heon Jeong a, Eric M. V. Hoek, Yushan Yan b, Arun Subramani, Xiaofei Huanga, Gil Hurwitz, Asim K. Ghosha, Anna Jawor, Interfacial polymerization of thin film nanocomposites: a new concept for reverse osmosis membranes, J. Membr. Sci. 294 (2007) 1-7, discloses a new membrane concept whereby fabrication was accomplished by adding inorganic nano-sized particles (eg. zeolite) to an organic phase, which led to higher permeate flux. C. Kong, A. Koushima, T. Kamada, T. Shintani, M. Kanezashi, T. Yoshioka, T. Tsuru, Enhanced performance of inorganic-polyamide nanocomposite membranes prepared by metal alkoxide-assisted interfacial polymerization, J. Membr. Sci. 366 (2011) 382-388, discloses higher permeate flux from organic-inorganic hybrid membranes by adding metal alkoxides to the organic phase. Polyamide membranes prepared by the addition of 5 wt % of phenyltriethoxysilane showed the best performance with a negligible rejection loss. C. Kong, M. Kanezashi, T. Yamamoto, T. Shintani, T. Tsuru, Co-solvent-mediated synthesis of thin polyamide membranes, J. Membr. Sci. 362 (2010) 76-80 and C. Kong, and T. Shintani, T. Kamada, V. Freger, T. Tsuru, Co-solvent-mediated synthesis of thin polyamide membranes, J. Membr. Sci. 384 (2011) 10-16, disclose that the addition of a co-solvent into the organic phase enhanced the miscibility at the interface, and led to high degree of permeate flux using the model type of polyamide, which was a MPD/TMC polyamide without the addition of additives to the water phase. Polyamide membranes prepared by the addition of 2 wt % acetone to the organic phase showed the best performance with a glucose rejection of 99.4% and a water flux of more than 1.4 m3/(m2 d) for 500 ppm glucose at 1.5 MPa, which was approximately 4-times higher than that of a membrane prepared without acetone.

Takashi Kamada, Tomomi Ohara, Takuji Shintani, Toshinori Tsuru, Controlled surface morphology of polyamide membranes via the addition of co-solvent for improved permeate flux, Journal of Membrane Science 467 (2014) 303-312, discloses the preparation of polyamide membranes with controlled surface morphology, by interfacial polymerisation in which co-solvents, which included acetone, ethyl acetate, diethyl ether, toluene, isopropyl alcohol (IPA) and N,N0-dimethyl formamide (DMF), were added into the organic phase which made it possible to control the surface morphology. Zhaofeng Liu, Guiru Zhu, Yulin Wei, Dapeng Zhang, Lei Jiang, Haizeng Wang and Congjie Gao, Enhanced flux performance of polyamide composite membranes prepared via interfacial polymerization assisted with ethyl formate, Water Science & Technology, 76.7 (2017) 1884-1894, discloses ethyl formate as a co-solvent added in the organic phase.

U.S. Pat. No. 6,337,018 B1 discloses a method for producing a composite membrane including the step of contacting a phosphorous containing compound with the polyfunctional acyl halide prior to and/or during the reaction between the polyfunctional acyl halide and polyfunctional amine to provide improved membranes having higher flux and/or rejection.

To save energy the users of membrane modules for e.g. reverse osmosis or forward osmosis need further optimization of semi-permeable membranes to increase the flux of water while maintaining essentially the same retention or rejection of solutes in the feed solution.

SUMMARY

In a first aspect, the present disclosure relates to a process for preparing a semi-permeable membrane, comprising the steps of:
providing an aqueous phase comprising a polyfunctional amine monomer,
covering a surface of a porous support membrane with the aqueous phase,
applying an organic phase comprising a polyfunctional acyl halide monomer, a phosphorous containing compound and a co-solvent, and
allowing the polyfunctional amine monomer and the polyfunctional acyl halide monomer to perform an interfacial polymerization reaction to form a polyamide thin film composite layer.

The experiments reported herein surprisingly show that the presence of the co-solvent together with the phosphorous compound in the organic phase potentiates the effect of the phosphorous compound so that the water flux is increased compared to the flux of a membrane in which only the phosphorous compound is present.

In a first implementation of the first aspect, the co-solvent is represented by the formula $R^1$—O—$R^2$, wherein
$R^1$ is selected from the group comprising a straight or branched $C_1$-$C_6$ lower alkyl, $C_1$-$C_6$ lower alkenyl or $C_1$-$C_6$ lower alkynyl, optionally substituted with 1 to 3 substituents independently selected among the group consisting of methyl, ethyl, propyl, flour, chlorine, bromine, iodine, hydroxy, aldehyde, carboxylic acid, amine, amide, nitril, methoxy, ethoxy, propoxy, isopropoxy, and any combination thereof, and
$R^2$ is selected from a group comprising a straight or branched $C_1$-$C_6$ lower alkyl, $C_1$-$C_6$ lower alkenyl, $C_1$-$C_6$ lower alkynyl, carbonyl $C_1$-$C_6$ lower alkyl, carbonyl $C_1$-$C_6$ lower alkenyl, carbonyl $C_1$-$C_6$ lower alkynyl, optionally substituted with 1 to 3 substituents selected among the group consisting of methyl, ethyl or propyl, flour, chlorine, bromine, iodine, hydroxy, aldehyde, carboxylic acid, amine, amide, nitril, methoxy, ethoxy, propoxy, isopropoxy, and any combination thereof.

In a second implementation of the first aspect $R^1$ is $C_1$-$C_6$ lower alkyl and $R^2$ is $C_1$-$C_6$ lower alkyl or carbonyl $C_1$-$C_6$ lower alkyl.

In a third implementation of the first aspect the co-solvent is selected from the group consisting of ethyl formate, ethyl acetate, and diethyl ether.

In a fourth implementation of the first aspect the co-solvent is a silane or an aromatic compound.

In a fifth implementation of the first aspect the silane is represented by the general formula $X_3$—Si—$R^1$, in which X is a halogen independently selected amount the group consisting of F, Cl, Br, and I, and $R^1$ is as defined above.

In a sixth implementation of the first aspect the $R^1$ is trifluoro $C_1$-$C_6$-alkyl, such as trifluoropropyl.

In a seventh implementation of the first aspect the aromatic compound comprises a benzene ring optionally substituted with 1 to 5 substituents selected among the group consisting of methyl, ethyl, propyl, flour, chlorine, bromine, iodine, hydroxy, aldehyde, carboxylic acid, amine, amide, nitril, methoxy, ethoxy, propoxy, isopropoxy, and any combination thereof.

In an eighth implementation of the first aspect the aromatic compound is mesitylene.

In a ninth implementation of the first aspect the phosphorous containing compound is reacted with the polyfunctional acyl halide prior to the step of reacting the polyfunctional acyl halide and the polyfunctional amine.

In a tenth implementation the phosphorous containing compound has an energy of interaction with the polyfunctional acyl halide of greater than about 4.0 kcal/mol.

In a eleventh implementation the phosphorous containing compound comprises at least one of: phosphates, phosphites, phosphines, phosphine oxides, phosphonates, diphosphonates, phosphinates, phosphinites, phosphonites, pyrophosphates, pyrophosphoramides, phosphor amides, phosphorothionates, phosphorodithionates, and phosphoroamido thionates.

In a twelfth implementation the phosphorous containing compound is represented by the formula:

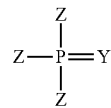

in which Z is the same or different and is selected from: $R^2$, O—P—$(R^2)_2$, P(O)—$X_2$, $(P(-R^2))_m$—P—$X_2$, (O—P(—$R^2$))$_m$—O—P—$R^2{}_2$, $(P(O)(-R^2))_m$—P(O)—$R^2{}_2$, and (O—P(O)(—$R^2$))$_m$—O—P(O)—$R^2{}_2$; P is phosphorous, O is oxygen, m is an integer from 1 to 5; Y is O or a non-bonded pair of electrons, $R^2$ is as defined above, X is the same or different and selected from: $R^3$ and $R^3$—O, $R^3$ being the same or different and selected from H (hydrogen), and a carbon containing moiety independently selected among $R^2$ groups.

In a thirteenth implementation the phosphorous containing compound is elected among the group comprising tri-methyl phosphate, tri-ethyl phosphate, tri-butyl phosphate, di-butyl phosphite, bis(2-ethyl hexyl) phosphite, tri-phenyl phosphine, tri-phenyl phosphate, tri-phenyl phosphine, tributyl phosphate, di-tert-butyl diisopropyl phosphoramidite, dibutylbutyl phosphonate, and tri-octyl phosphine.

In a fourteenth implementation the concentration of the phosphorous containing compound in the organic phase is 0.2 to 5%.

In a fifteenth implementation the concentration of the co-solvent in the organic phase is 0.001 to 5%.

In a sixteenth implementation the proportion between the concentration of the phosphorous containing compound and the co-solvent in the organic phase is 5:1 to 1:5.

In a seventeenth implementation the main solvent of the organic phase comprises linear or branched $C_5$-$C_{12}$ alkanes.

In a eighteenth implementation the aqueous phase further comprises vesicles having aquaporins incorporated therein.

In a nineteenth implementation the vesicles comprises poly-block-(2-methyloxazoline)-poly-block-(dimethylsiloxane) (PMOXA-PDMS) and amine functionalized poly (dimethylsiloxane) as vesicle membrane forming materials.

In a twentieth implementation the support membrane comprises polysulfone or a polyethersulfone polymer.

In a twenty-firth implementation the porous support membrane is a hollow fiber.

In a twenty-second implementation the process comprises the further step of producing a hollow fiber module by assembling a bundle of hollow fibers in a housing, wherein an inlet for passing a first solution is connected to the lumen of the hollow fibers in one end and an outlet is connected to the lumen in the other end, and an inlet is provided in the housing for passing a second solution to an outlet connected to the housing.

In a twenty-third implementation the porous support membrane is a flat sheet.

In an twenty-fourth implementation the process comprises the further step of producing a spiral wound module by winding the flat sheet membrane.

In second aspect, the invention relates to a semi-permeable membrane prepared by the process above.

In a third aspect, the invention relates to a hollow fiber module.

In a fourth aspect the invention relates to a spiral wound module.

In a fifth aspect, the invention relates to the use of the hollow fiber module or the spiral wound module for preparing a water permeate by reverse osmosis.

In a sixth aspect, the invention relates to the use of the hollow fiber module or the spiral wound membrane module for the concentration of a product solution by forward osmosis.

DETAILED DESCRIPTION OF THE INVENTION

The polyfunctional amine monomer may have primary or secondary amino groups and may be aromatic (e.g., m-phenylenediamine, p-phenyenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, diethylene triamine, dipropylene triamine, phenylenetriamine, bis(hexamethylene)triamine, bis(hexa-methylene)triamine, bis(3-aminopropyl)amine, hexamethylene-diamine, N-tallowalkyl dipropylene, 1,3,5-triazine-2,4,6-triamine, and tris(2-diaminoethyl)amine). The polyfunctional amine monomer is suitably a di- or triamine compound. Examples of preferred polyamine species include primary aromatic amines having two or three amino groups, most especially m-phenylene diamine (MPD), and secondary aliphatic amines having two amino groups, most especially piperazine.

The polyfunctional acyl halide monomer is generally a di- or triacyl halide compound, which may be selected among trimesoyl chloride (TMC), trimesoyl bromide, isophthaloyl chloride (IPC), isophthaloyl bromide, terephthaloyl chloride (TPC), terephthaloyl bromide, adipoyl chloride, cyanuric chloride and mixtures of these compounds. The monomeric polyfunctional acyl halide is preferably coated from a non-polar organic solvent, although the polyfunctional acyl halide may be delivered from a vapor phase (for polyacyl halides having sufficient vapor pressure). The polyfunctional acyl halides are preferably aromatic in nature and contain at least two and preferably three acyl halide groups per molecule. Because of their lower cost and greater availability, chlorides are generally preferred over the corresponding bromides or iodides. One preferred polyfunctional acyl is TMC.

The phosphorous containing compounds are not particularly limited and different species of compounds may be used in combination.

A preferred class of phosphorous containing compounds can be represented below by following Formula 1:

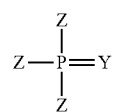

Formula 1 wherein Z is the same or different and is selected from X, O—P—(X)2, P(O)—X2, (P(—X))m-P—X2, (O—P(—X))m-O—P—X2, (P(O)(—X))m-P(O)—X2, and (O—P(O)(—X))m-O—P(O)—X2, wherein P is phosphorous, O is oxygen, m is an integer from 1 to 5; and Y is O (oxygen) or a non-bonded pair of electrons, as indicated in Formula 2 and 3, respectively;

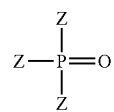

Formula 2

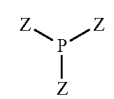

Formula 3 wherein X is the same or different and is selected from: R, R—O—R, or O—R, R being the same or different and selected from H (hydrogen), and/or a carbon containing moiety. The Z groups are preferably selected such that they collectively result in the phosphorous containing compound being substantially soluble in the organic solution.

The phrase "the same or different" is intended to mean that the individual groups represented by a single symbol, e.g., "R", may vary within a given compound. For example, for any given compound, one R group may be hydrogen whereas the other R groups may be butyl groups.

The term "carbon containing moiety" is intended to mean branched and unbranched acyclic groups, e.g., methyl, ethyl, propyl, isopropyl, butyl, isobutyl, pentyl, 2-pentyl, 3-pentyl, tert-butyl, etc. which may be unsubstituted or substituted (e.g., substituted with amide groups, ether groups, ester groups, sulfone groups, carbonyl groups, anhydrides, cyanide, nitrile, isocynate, urethane, beta-hydroxy ester, double and triple bonds etc.), and cyclic groups, e.g., cyclo pentyl, cyclo hexyl, aromatics, e.g., phenyl, heterocyclic, etc., which may be unsubstituted or substituted, (e.g., substituted with methyl, ethyl, propyl, hydroxyl, amide, ether, sulfone, carbonyl, ester, etc.). Cyclo moieties may be linked to the phosphorous atom by way of an aliphatic liking group, e.g., methyl, ethyl, etc.

Preferred carbon containing moieties include unsubstituted, branched or unbranched C1-C12 groups, and more preferably C1-C8 aliphatic groups such as methyl, ethyl, propyl, isopropyl, butyl, 2-methyl butyl, 3-methyl butyl, 2-ethyl butyl, pentyl, hexyl, etc. Additionally, preferred moieties include phenyl groups. Examples of preferred sub-classes of phosphorous compounds are represented by Formulae 4-9:

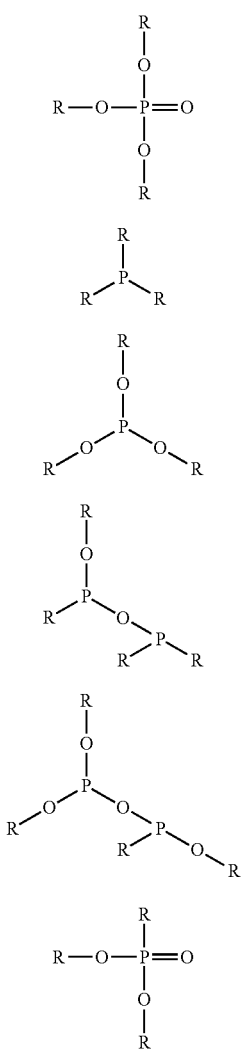

Formula 4
Formula 5
Formula 6
Formula 7
Formula 8
Formula 9 wherein R, P and O are as previously defined. Such phosphorous containing compounds are commercially available or can be synthesized using known methodologies, see for example U.S. Pat. No. 2,648,696 to Whetstone, incorporated herein by reference, and Aharoni et al., Journal of Polymer Science, Volume 22, 2579-2599.

Examples of classes of applicable phosphorous containing compounds include: phosphates (e.g., phosphate esters), phosphites, phosphines, phosphine oxides, phosphonates, including diphosphonates, phosphinates, phosphinites, phosphonites, pyrophosphates, pyrophosphoramides, phosphor amides, phosphorothionates including phosphoro dithionates, phosphorodithionates, phosphoro amido thionates, and phosphonothioates including phosphonodithioates. A non-comprehensive list of specific examples of each class are provided below.

Specific examples of tri-phosphates include: tri-methyl phosphate, tri-ethyl phosphate, tri-(1-propyl)phosphate, tri-(2-propyl)phosphate, tri-(1-butyl)phosphate, tri-(2-butyl) phosphate, tri-(1-tert-butyl)phosphate, tri-(2-tert-butyl) phosphate, tri-(1-pentyl)phosphate, tri-(2-pentyl)phosphate, tri-(3-pentyl)phosphate, tri-(1-hexyl)phosphate, tri-(2-hexyl)phosphate, tri-(3-hexyl)phosphate, tri-(1-heptyl)phosphate, tri-(2-heptyl)phosphate, tri-(3-heptyl)phosphate, tri-(4-heptyl)phosphate, tri-(1-octyl)phosphate, tri-(2-octyl) phosphate, tri-(3-octyl)phosphate, tri-(4-octyl)phosphate, tri-(1-CH3(CH2)8)phosphate, tri-(2-CH3(CH2)8) phosphate, tri-(3-CH3(CH2)8)phosphate, tri-(4-CH3(CH2)8) phosphate, tri-(1-CH3(CH2)9)phosphate, tri-(2-CH3(CH2)9)phosphate, tri-(3-CH3(CH2)9)phosphat, tri-(4-CH3(CH2)9)phosphate, tri-(5-CH3(CH2)9)phosphate, tri-(1-CH3(CH2)10)phosphate, tri-(2-CH3(CH2)10)phosphate, tri-(3-CH3(CH2)10)phosphate, tri-(4-CH3(CH2)10)phosphate, tri-(5-CH3(CH2)10)phosphate, tri-(1-CH3(CH2)11)phosphate, tri-(2-CH3(CH2)11)phosphate, tri-(3-CH3(CH2)11) phosphate, tri-(4-CH3(CH2)11)phosphate, tri-(5-CH3(CH2)11)phosphate, tri-(6-CH3(CH2)11)phosphate, tri-(1-CH3(CH2)12)phosphate, tri-(2-CH3(CH2)12)phosphate, tri-(3-CH3(CH2)12)phosphate, tri-(4-CH3(CH2)12)phosphate, tri-(5-CH3(CH2)12)phosphate, tri-(6-CH3(CH2)12)phosphate, tri-(methyl pentyl)phosphate, tri-(ethyl pentyl)phosphate, tri-(methyl hexyl)phosphate, tri-(ethyl hexyl)phosphate, tri-(propyl hexyl)phosphate, tri-(methyl heptyl) phosphate, tri-(ethyl heptyl)phosphate, tri-(diethyl heptyl) phosphate, tri-(methyl octyl)phosphate, tri-(dimethyl octyl) phosphate, methyl di-(-ethyl)phosphate, methyl di-(1-propyl)phosphate, methyl di-(2-propyl)phosphate, methyl di-(1-butyl)phosphate, methyl di-(2-butyl)phosphate, methyl di-(1-tert-butyl)phosphate, methyl di-(2-tert-butyl) phosphate, methyl di-(1-pentyl)phosphate, methyl di-(2-pentyl)phosphate, methyl di-(3-pentyl)phosphate, methyl di-(1-hexyl)phosphate, methyl di-(2-hexyl)phosphate, methyl di-(3-hexyl)phosphate, methyl di-(1-heptyl)phosphate, methyl di-(2-heptyl)phosphate, methyl di-(3-heptyl) phosphate, methyl di-(4-heptyl)phosphate, methyl di-(1-octyl)phosphate, methyl di-(2-octyl)phosphate, methyl di-(3-octyl)phosphate, methyl di-(4-octyl)phosphate, methyl di-(1-CH3 (CH2) 8)phosphate, methyl di-(2-CH3(CH2)8) phosphate, methyl di-(3-CH3(CH2)8)phosphate, methyl di-(4-CH3 (CH2) 8)phosphate, methyl di-(1-CH3 (CH2) 9)phosphate, methyl di-(2-CH3(CH2)9)phosphate, methyl di-(3-CH3(CH2)9)phosphate, methyl di-(4-CH3(CH2)9) phosphate, methyl di-(5-CH3(CH2)9)phosphate, methyl di-(1-CH3(CH2)10)phosphate, methyl di-(2-CH3(CH2)10) phosphate, methyl di-(3-CH3(CH2)10)phosphate, methyl di-(4-CH3(CH2)10)phosphate, methyl di-(5-CH3(CH2)10) phosphate, methyl di-(1-CH3(CH2)11)phosphate, methyl di-(2-CH3(CH2)11)phosphate, methyl di-(3-CH3(CH2)11) phosphate, methyl di-(4-CH3(CH2)11)phosphate, methyl di-(5-CH3(CH2)11)phosphate, methyl di-(6-CH3(CH2)11) phosphate, methyl di-(1-CH3(CH2)12)phosphate, methyl di-(2-CH3(CH2)12)phosphate, methyl di-(3-CH3(CH2)12) phosphate, methyl di-(4-CH3(CH2)12)phosphate, methyl di-(5-CH3(CH2)12)phosphate, methyl di-(6-CH3 (CH2) 12)phosphate, ethyl di-(1-propyl)phosphate, ethyl di-(2-propyl)phosphate, ethyl di-(1-butyl)phosphate, ethyl di-(2-butyl)phosphate, ethyl di-(1-tert-butyl)phosphate, ethyl di-(2-tert-butyl)phosphate, ethyl di-(1-pentyl)phosphate, ethyl di-(2-pentyl)phosphate, ethyl di-(3-pentyl)phosphate, ethyl di-(1-hexyl)phosphate, ethyl di-(2-hexyl)phosphate, ethyl di-(3-hexyl)phosphate, ethyl di-(1-heptyl)phosphate, ethyl di-(2-heptyl)phosphate, ethyl di-(3-heptyl)phosphate, ethyl di-(4-heptyl)phosphate, ethyl di-(1-octyl)phosphate, ethyl di-(2-octyl)phosphate, ethyl di-(3-octyl)phosphate, ethyl di-(4-octyl)phosphate, ethyl di-(1-CH3(CH2)8)phosphate, ethyl di-(2-CH3(CH2)8)phosphate, ethyl di-(3-CH3(CH2) 8)phosphate, ethyl di-(4-CH3(CH2)8)phosphate, ethyl di-(1-CH3(CH2)9)phosphate, ethyl di-(2-CH3(CH2)9)phosphate, ethyl di-(3-CH3(CH2)9)phosphate, ethyl di-(4-CH3(CH2)9)phosphate, ethyl di-(5-CH3(CH2)9)phosphate, ethyl di-(1-CH3(CH2)10)phosphate, ethyl di-(2-CH3(CH2)

10)phosphate, ethyl di-(3-CH3(CH2)10)phosphate, ethyl di-(4-CH3(CH2)10)phosphate, ethyl di-(5-CH3(CH2)10)phosphate, ethyl di-(1-CH3(CH2)11)phosphate, ethyl di-(2-CH3(CH2)11)phosphate, ethyl di-(3-CH3(CH2)11)phosphate, ethyl di-(4-CH3(CH2)11)phosphate, ethyl di-(5-CH3(CH2)11)phosphate, ethyl di-(6-CH3(CH2)11)phosphate, ethyl di-(1-CH3(CH2)12)phosphate, ethyl di-(2-CH3(CH2)12)phosphate, ethyl di-(3-CH3(CH2)12)phosphate, ethyl di-(4-CH3(CH2)12)phosphate, ethyl di-(5-CH3(CH2)12)phosphate, ethyl di-(6-CH3(CH2)12)phosphate, 1-propyl di-(2-propyl)phosphate, 1-propyl di-(1-butyl)phosphate, 1-propyl di-(2-butyl)phosphate, 1-propyl di-(1-tert-butyl)phosphate, 1-propyl di-(2-tert-butyl)phosphate, 1-propyl di-(1-pentyl)phosphate, 1-propyl di-(2-pentyl)phosphate, 1-propyl di-(3-pentyl)phosphate, 1-propyl di-(1-hexyl)phosphate, 1-propyl di-(2-hexyl)phosphate, 1-propyl di-(3-hexyl)phosphate, 1-propyl di-(1-heptyl)phosphate, 1-propyl di-(2-heptyl)phosphate, 1-propyl di-(3-heptyl)phosphate, 1-propyl di-(4-heptyl)phosphate, 1-propyl di-(1-octyl)phosphate, 1-propyl di-(2-octyl)phosphate, 1-propyl di-(3-octyl)phosphate, 1-propyl di-(4-octyl)phosphate, 1-propyl di-(1-CH3(CH2)8)phosphate, 1-propyl di-(2-CH3(CH2)8)phosphate, 1-propyl di-(3-CH3(CH2)8)phosphate, 1-propyl di-(4-CH3(CH2)8)phosphate, 1-propyl di-(1-CH3(CH2)9)phosphate, 1-propyl di-(2-CH3(CH2)9)phosphate, 1-propyl di-(3-CH3(CH2)9)phosphate, 1-propyl di-(4-CH3(CH2)9)phosphate, 1-propyl di-(5-CH3(CH2)9)phosphate, 1-propyl di-(1-CH3(CH2)10)phosphate, 1-propyl di-(2-CH3(CH2)10)phosphate, 1-propyl di-(3-CH3(CH2)10)phosphate, 1-propyl di-(4-CH3(CH2)10)phosphate, 1-propyl di-(5-CH3(CH2)10)phosphate, 1-propyl di-(1-CH3(CH2)11)phosphate, 1-propyl di-(2-CH3(CH2)11)phosphate, 1-propyl di-(3-CH3(CH2)11)phosphate, 1-propyl di-(4-CH3(CH2)11)phosphate, 1-propyl di-(5-CH3(CH2)11)phosphate, 1-propyl di-(6-CH3(CH2)11)phosphate, 1-propyl di-(1-CH3(CH2)12)phosphate, 1-propyl di-(2-CH3(CH2)12)phosphate, 1-propyl di-(3-CH3(CH2)12)phosphate, 1-propyl di-(4-CH3(CH2)12)phosphate, 1-propyl di-(5-CH3(CH2)12)phosphate, 1-propyl di-(6-CH3(CH2)12)phosphate, 2-propyl di-(1-butyl)phosphate, 2-propyl di-(2-butyl)phosphate, 2-propyl di-(1-tert-butyl)phosphate, 2-propyl di-(2-tert-butyl)phosphate, 2-propyl di-(1-pentyl)phosphate, 2-propyl di-(2-pentyl)phosphate, 2-propyl di-(3-pentyl)phosphate, 2-propyl di-(1-hexyl)phosphate, 2-propyl di-(2-hexyl) phosphate, 2-propyl di-(3-hexyl)phosphate, 2-propyl di-(1-heptyl)phosphate, 2-propyl di-(2-heptyl)phosphate, 2-propyl di-(3-heptyl)phosphate, 2-propyl di-(4-heptyl)phosphate, 2-propyl di-(1-octyl)phosphate, 2-propyl di-(2-octyl)phosphate, 2-propyl di-(3-octyl)phosphate, 2-propyl di-(4-octyl) phosphate, 2-propyl di-(1-CH3(CH2)8)phosphate, 2-propyl di-(2-CH3(CH2)8)phosphate, 2-propyl di-(3-CH3(CH2)8)phosphate, 2-propyl di-(4-CH3(CH2)8)phosphate, 2-propyl di-(1-CH3(CH2)9)phosphate, 2-propyl di-(2-CH3(CH2)9)phosphate, 2-propyl di-(3-CH3(CH2)9)phosphate, 2-propyl di-(4-CH3(CH2)9)phosphate, 2-propyl di-(5-CH3(CH2)9)phosphate, 2-propyl di-(1-CH3(CH2)10)phosphate, 2-propyl di-(2-CH3(CH2)10)phosphate, 2-propyl di-(3-CH3(CH2)10)phosphate, 2-propyl di-(4-CH3(CH2)10)phosphate, 2-propyl di-(5-CH3(CH2)10)phosphate, 2-propyl di-(1-CH3(CH2)11)phosphate, 2-propyl di-(2-CH3(CH2)11)phosphate, 2-propyl di-(3-CH3(CH2)11)phosphate, 2-propyl di-(4-CH3(CH2)11)phosphate, 2-propyl di-(5-CH3(CH2)11)phosphate, 2-propyl di-(6-CH3(CH2)11)phosphate, 2-propyl di-(1-CH3(CH2)12)phosphate, 2-propyl di-(2-CH3(CH2)12)phosphate, 2-propyl di-(3-CH3(CH2)12)phosphate, 2-propyl di-(4-CH3(CH2)12)phosphate, 2-propyl di-(5-CH3(CH2)12)phosphate, 2-propyl di-(6-CH3(CH2)12)phosphate, butyl di-(1-tert-butyl)phosphate, butyl di-(2-tert-butyl)phosphate, butyl di-(1-pentyl)phosphate, butyl di-(2-pentyl)phosphate, butyl di-(3-pentyl)phosphate, butyl di-(1-hexyl)phosphate, butyl di-(2-hexyl)phosphate, butyl di-(3-hexyl)phosphate, butyl di-(1-heptyl)phosphate, butyl di-(2-heptyl)phosphate, butyl di-(3-heptyl)phosphate, butyl di-(4-heptyl)phosphate, butyl di-(1-octyl)phosphate, butyl di-(2-octyl)phosphate, butyl di-(3-octyl)phosphate, butyl di-(4-octyl)phosphate, butyl di-(1-CH3(CH2)8)phosphate, butyl di-(2-CH3(CH2)8)phosphate, butyl di-(3-CH3(CH2)8)phosphate, butyl di-(4-CH3(CH2)8)phosphate, butyl di-(1-CH3(CH2)9)phosphate, butyl di-(2-CH3(CH2)9)phosphate, butyl di-(3-CH3(CH2)9)phosphate, butyl di-(4-CH3(CH2)9)phosphate, butyl di-(5-CH3(CH2)9)phosphate, butyl di-(1-CH3(CH2)10)phosphate, butyl di-(2-CH3(CH2)10)phosphate, butyl di-(3-CH3(CH2)10)phosphate, butyl di-(4-CH3(CH2)10)phosphate, butyl di-(5-CH3(CH2)10)phosphate, butyl di-(1-CH3(CH2)11)phosphate, butyl di-(2-CH3(CH2)11)phosphate, butyl di-(3-CH3(CH2)11)phosphate, butyl di-(4-CH3(CH2)11)phosphate, butyl di-(5-CH3(CH2)11)phosphate, butyl di-(6-CH3(CH2)11)phosphate, butyl di-(1-CH3(CH2)12)phosphate, butyl di-(2-CH3(CH2)12)phosphate, butyl di-(3-CH3(CH2)12)phosphate, butyl di-(4-CH3(CH2)12)phosphate, butyl di-(5-CH3(CH2)12)phosphate, butyl di-(6-CH3(CH2)12)phosphate, methyl ethyl propyl phosphate, methyl ethyl butyl phosphate, methyl ethyl pentyl phosphate, methyl ethyl hexyl phosphate, methyl ethyl heptyl phosphate, methyl ethyl octyl phosphate, methyl propyl butyl phosphate, methyl propyl pentyl phosphate, methyl propyl hexyl phosphate, methyl propyl heptyl phosphate, methyl propyl octyl phosphate, methyl butyl pentyl phosphate, methyl butyl hexyl phosphate, methyl butyl heptyl phosphate, methyl butyl octyl phosphate, methyl pentyl hexyl phosphate, methyl pentyl heptyl phosphate, methyl pentyl octyl phosphate, methyl hexyl heptyl phosphate, methyl hexyl octyl phosphate, ethyl propyl butyl phosphate, ethyl propyl pentyl phosphate, ethyl propyl hexyl phosphate, ethyl propyl heptyl phosphate, ethyl propyl octyl phosphate, ethyl butyl pentyl phosphate, ethyl butyl hexyl phosphate, ethyl butyl heptyl phosphate, ethyl butyl octyl phosphate, ethyl pentyl hexyl phosphate, ethyl pentyl heptyl phosphate, ethyl pentyl octyl phosphate, ethyl hexyl heptyl phosphate, ethyl hexyl octyl phosphate, tri-phenyl phosphate, methyl di-phenyl phosphate, ethyl di-phenyl phosphate, 1 propyl di-phenyl phosphate, 2 propyl di-phenyl phosphate, 1 butyl di-phenyl phosphate, 2 butyl di-phenyl phosphate, 1 tert-butyl di-phenyl phosphate, 2 tert-butyl di-phenyl phosphate, 1 pentyl di-phenyl phosphate, 2 pentyl di-phenyl phosphate, 3 pentyl di-phenyl phosphate, 1 hexyl di-phenyl phosphate, 2 hexyl di-phenyl phosphate, 3 hexyl di-phenyl phosphate, 1 heptyl di-phenyl phosphate, 2 heptyl di-phenyl phosphate, 3 heptyl di-phenyl phosphate, 4 heptyl di-phenyl phosphate, 1 octyl di-phenyl phosphate, 2 octyl di-phenyl phosphate, 3 octyl di-phenyl phosphate, 4 octyl di-phenyl phosphate, 1 CH3(CH2)8 di-phenyl phosphate, 2 CH3(CH2)8 di-phenyl phosphate, 3 CH3(CH2)8 di-phenyl phosphate, 4 CH3(CH2)8 di-phenyl phosphate, 1 CH3(CH2)9 di-phenyl phosphate, 2 CH3(CH2)9 di-phenyl phosphate, 3 CH3(CH2)9 di-phenyl phosphate, 4 CH3(CH2)9 di-phenyl phosphate, 5 CH3(CH2)9 di-phenyl phosphate, 1 CH3(CH2)10 di-phenyl phosphate, 2 CH3(CH2)10 di-phenyl phosphate, 3 CH3(CH2)10 di-phenyl phosphate, 4 CH3(CH2)10 di-phenyl phosphate, 5 CH3(CH2)10 di-phenyl phosphate, 1 CH3(CH2)11 di-phenyl phosphate, 2 CH3(CH2)11 di-phenyl phosphate, 3 CH3(CH2)11 di-phenyl phosphate, 4 CH3(CH2)11 di-phenyl phosphate, 5 CH3(CH2)11 di-phenyl phosphate, 6 CH3(CH2)11 di-phenyl phosphate, 1 CH3(CH2)12 di-phenyl phosphate, 2 CH3(CH2)12 di-phenyl phosphate, 3 CH3(CH2)12 di-phenyl phosphate, 4 CH3(CH2)12 di-phenyl phosphate, 5 CH3(CH2)12 di-phenyl phosphate, 6 CH3(CH2)12 di-phenyl phosphate, di-methyl phenyl phosphate, di-ethyl phenyl phosphate, di-(1-propyl) phenyl phosphate, di-(2-propyl)phenyl phosphate, di-(-isopropyl)phenyl phosphate, di-(1-butyl)phenyl phosphate, di-(2-butyl)phenyl phosphate, di-(1-tert-butyl)phenyl phosphate, di-(2-tert-butyl)phenyl phosphate, di-(1-pentyl) phenyl phosphate, di-(2-pentyl)phenyl phosphate, di-(3-pentyl)phenyl phosphate, di-(1-hexyl)phenyl phosphate, di-(2-hexyl)phenyl phosphate, di-(3-hexyl)phenyl phosphate, di-(1-heptyl)phenyl phosphate, di-(2-heptyl)phenyl phosphate, di-(3-heptyl)phenyl phosphate, di-(4-heptyl)phenyl phosphate, di-(1-octyl)phenyl phosphate, di-(2-octyl)phenyl phosphate, di-(3-octyl)phenyl phosphate, di-(4-octyl)phenyl phosphate, di-(1-CH3(CH2)8)phenyl phosphate, di-(2-CH3(CH2)8)phenyl phosphate, di-(3-CH3(CH2)8)phenyl phosphate, di-(4-CH3(CH2)8)phenyl phosphate, di-(1-CH3(CH2)9)phenyl phosphate, di-(2-CH3(CH2)9)phenyl phosphate, di-(3-CH3(CH2)9)phenyl phosphate, di-(4-CH3(CH2)9)phenyl phosphate, di-(5-CH3(CH2)9)phenyl phosphate, di-(1-CH3(CH2)10)phenyl phosphate, di-(2-CH3(CH2)10)phenyl phosphate, di-(3-CH3(CH2)10)phenyl phosphate, di-(4-CH3(CH2)10)phenyl phosphate, di-(5-CH3(CH2)10)phenyl phosphate, di-(1-CH3(CH2)11)phenyl phosphate, di-(2-CH3(CH2)11)phenyl phosphate, di-(3-CH3(CH2)11)phenyl phosphate, di-(4-CH3(CH2)11)phenyl phosphate, di-(5-CH3(CH2)11)phenyl phosphate, di-(6-CH3(CH2)11)phenyl phosphate, di-(1-CH3(CH2)12)phenyl phosphate, di-(2-CH3(CH2)12)phenyl phosphate, di-(3-CH3(CH2)12)phenyl phosphate, di-(4-CH3(CH2)12)phenyl phosphate, di-(5-CH3(CH2)12)phenyl phosphate, di-(6-CH3(CH2)12)phenyl phosphate, tri-ethylene phosphate, tri-(1-propene)phosphate, tri-(2-propene)phosphate, tri-(3-propene)phosphate, tri-(1-(1-butene))phosphate, tri-(2-(1-butene))phosphate, tri-(3-(1-butene))phosphate, tri-(4-(1-butene))phosphate, tri-(1-(2-butene))phosphate, tri-(2-(2-butene))phosphate, tri-(3-(2-butene))phosphate, tri-(4-(2-butene))phosphate, tri-(1-(1-pentene))phosphate, tri-(2-(1-pentene))phosphate, tri-(3-(1-pentene))phosphate, tri-(4-(1-pentene))phosphate, tri-(5-(1-pentene))phosphate, tri-(1-(2-pentene))phosphate, tri-(2-(2-pentene))phosphate, tri-(3-(2-pentene))phosphate, tri-(4-(2-pentene))phosphate, tri-(5-(2-pentyl))phosphate, tri-(1-(1-hexene))phosphate, tri-(2-(1-hexene))phosphate, tri-(3-(1-hexene))phosphate, tri-(4-(1-hexene))phosphate, tri-(5-(1-hexene))phosphate, tri-(6-(1-hexene))phosphate, tri-(1-(3-hexene))phosphate, tri-(2-(3-hexene))phosphate, tri-(3-(3-hexene))phosphate, tri-(4-(3-hexene))phosphate, tri-(5-(3-hexene))phosphate, tri-(6-(3-hexene))phosphate, tri-(1-(2-hexene))phosphate, tri-(2-(2-hexene))phosphate, tri-(3-(2-hexene))phosphate, tri-(4-(2-hexene))phosphate, tri-(5-(2-hexene))phosphate, tri-(6-(2-hexene))phosphate, tri-(phenyl methyl)phosphate, tri-(2-methyl phenyl)phosphate, tri-(3-methyl phenyl)phosphate, tri-(4-methyl phenyl)phosphate, tri-(2-ethyl phenyl)phosphate, tri-(3-ethyl phenyl)phosphate, and tri-(4-ethyl phenyl)phosphate.

Specific examples of di-phosphates include: di-methyl phosphate, di-ethyl phosphate, di-(1-propyl)phosphate, di-(2-propyl)phosphate, di-(1-butyl)phosphate, di-(2-butyl)phosphate, di-(1-tert-butyl)phosphate, di-(2-tert-butyl)phosphate, di-(1-pentyl)phosphate, di-(2-pentyl)phosphate, di-(3-pentyl)phosphate, di-(1-hexyl)phosphate, di-(2-hexyl)phosphate, di-(3-hexyl)phosphate, di-(1-heptyl)phosphate, di-(2-heptyl)phosphate, di-(3-heptyl)phosphate, di-(4-heptyl)phosphate, di-(1-octyl)phosphate, di-(2-octyl)phosphate, di-(3-octyl)phosphate, di-(4-octyl)phosphate, di-(1-CH3(CH2)8)phosphate, di-(2-CH3(CH2)8)phosphate, di-(3-CH3(CH2)8)phosphate, di-(4-CH3(CH2)8)phosphate, di-(1-CH3(CH2)9)phosphate, di-(2-CH3(CH2)9)phosphate, di-(3-CH3(CH2)9)phosphate, di-(4-CH3(CH2)9)phosphate, di-(5-CH3(CH2)9)phosphate, di-(1-CH3(CH2)10)phosphate, di-(2-CH3(CH2)10)phosphate, di-(3-CH3(CH2)10)phosphate, di-(4-CH3(CH2)10)phosphate, di-(5-CH3(CH2)10)phosphate, di-(1-CH3(CH2)11)phosphate, di-(2-CH3(CH2)11)phosphate, di-(3-CH3(CH2)11)phosphate, di-(4-CH3(CH2)11)phosphate, di-(5-CH3(CH2)11)phosphate, di-(6-CH3(CH2)11)phosphate, di-(1-CH3(CH2)12)phosphate, di-(2-CH3(CH2)12)phosphate, di-(3-CH3(CH2)12)phosphate, di-(4-CH3(CH2)12)phosphate, di-(5-CH3(CH2)12)phosphate, di-(6-CH3(CH2)12)phosphate, di-(1-(methyl pentyl))phosphate, di-(2-(methyl pentyl))phosphate, di-(3-(methyl pentyl))phosphate, di-(1-(di-methyl pentyl))phosphate, di-(2-(di-methyl pentyl))phosphate, di-(3-(di-methyl pentyl))phosphate, di-(1-(ethyl pentyl))phosphate, di-(2-(ethyl pentyl))phosphate, di-(3-(ethyl pentyl))phosphate, di-(1-(methyl hexyl))phosphate, di-(2-(methyl hexyl))phosphate, di-(3-(methyl hexyl))phosphate, di-(1-(di-methyl hexyl))phosphate, di-(2-(di-methyl hexyl))phosphate, di-(3-(di-methyl hexyl))phosphate, di-(1-(ethyl hexyl))phosphate, di-(2-(ethyl hexyl))phosphate, di-(3-(ethyl hexyl))phosphate, di-(methyl heptyl)phosphate, di-(di-methyl heptyl)phosphate, di-(ethyl heptyl)phosphate, di-(methyl octyl)phosphate, di-(di-methyl octyl)phosphate, di-(ethyl octyl)phosphate, methyl ethyl phosphate, methyl propyl phosphate, methyl butyl phosphate, methyl tert-butyl phosphate, methyl pentyl phosphate, methyl hexyl phosphate, methyl heptyl phosphate, methyl octyl phosphate, methyl CH3(CH2)8 phosphate, methyl CH3(CH2)9 phosphate, methyl CH3(CH2)10 phosphate, methyl CH3(CH2)11 phosphate, methyl CH3(CH2)12 phosphate, ethyl propyl phosphate, ethyl butyl phosphate, ethyl tert-butyl phosphate, ethyl pentyl phosphate, ethyl hexyl phosphate, ethyl heptyl phosphate, ethyl octyl phosphate, ethyl CH3(CH2)8 phosphate, ethyl CH3(CH2)9 phosphate, ethyl CH3(CH2)10 phosphate, ethyl CH3(CH2)11 phosphate, ethyl CH3(CH2)12 phosphate, propyl butyl phosphate, propyl tert-butyl phosphate, propyl pentyl phosphate, propyl hexyl phosphate, propyl heptyl phosphate, propyl octyl phosphate, propyl CH3(CH2)8 phosphate, propyl CH3(CH2)9 phosphate, propyl CH3(CH2)10 phosphate, propyl CH3(CH2)11 phosphate, propyl CH3(CH2)12 phosphate, butyl tert-butyl phosphate, tert-butyl pentyl phosphate, tert-butyl hexyl phosphate, tert-butyl heptyl phosphate, tert-butyl octyl phosphate, tert-butyl CH3(CH2)8 phosphate, tert-butyl CH3(CH2)9 phosphate, tert-butyl CH3(CH2)10 phosphate, tert-butyl CH3(CH2)11 phosphate, tert-butyl CH3(CH2)12 phosphate, pentyl hexyl phosphate, pentyl heptyl phosphate, pentyl octyl phosphate, pentyl CH3(CH2)8 phosphate, pentyl CH3(CH2)9 phosphate, pentyl CH3(CH2)10 phosphate, pentyl CH3(CH2)11 phosphate, pentyl CH3(CH2)12 phosphate, hexyl heptyl phosphate, hexyl octyl phosphate, hexyl CH3(CH2)8 phosphate, hexyl CH3(CH2)9 phosphate, hexyl CH3(CH2)10 phosphate, hexyl CH3(CH2)11 phosphate, hexyl CH3(CH2)12 phosphate, di-butene phosphate, di-pentene phosphate, di-hexene phosphate, di-heptene phosphate, and di-octene phosphate.

Specific examples of mono-phosphates include: methyl phosphate, ethyl phosphate, propyl phosphate, butyl phosphate, pentyl phosphate, hexyl phosphate, heptyl phosphate, octyl phosphate, CH3(CH2)8 phosphate, CH3(CH2)9 phosphate, CH3(CH2)10 phosphate, CH3(CH2)11 phosphate, CH3(CH2)12 phosphate, methyl propyl phosphate, methyl butyl phosphate, methyl pentyl phosphate, methyl hexyl phosphate, methyl heptyl phosphate, methyl octyl phosphate, methyl CH3(CH2)8 phosphate, methyl CH3(CH2)9 phosphate, methyl CH3(CH2)10 phosphate, methyl CH3(CH2)11 phosphate, methyl CH3(CH2)12 phosphate, di-methyl butyl phosphate, di-methyl pentyl phosphate, di-methyl hexyl phosphate, di-methyl heptyl phosphate, di-methyl octyl phosphate, di-methyl CH3(CH2)8 phosphate, di-methyl CH3(CH2)9 phosphate, di-methyl CH3(CH2)10 phosphate, di-methyl CH3(CH2)11 phosphate, di-methyl CH3(CH2)12 phosphate, ethyl butyl phosphate, ethyl pentyl phosphate, ethyl hexyl phosphate, ethyl heptyl phosphate, ethyl octyl phosphate, ethyl CH3(CH2)8 phosphate, ethyl CH3(CH2)9 phosphate, ethyl CH3(CH2)10 phosphate, ethyl CH3(CH2)11 phosphate, ethyl CH3(CH2)12 phosphate, butene phosphate, pentene phosphate, hexene phosphate, heptene phosphate, and octene phosphate.

For purposes of brevity, a complete list of phosphites is not provided; however, applicable phosphite species correspond to the each of the tri, di, and mono phosphates provided in the preceding paragraphs. For example, by simply replacing the word "phosphate" with "phosphite" in the preceding paragraphs, one can quickly generate a list of representative phosphite species applicable to the subject invention.

Examples of phosphine compounds include:

Tri-(1-hexyl)phosphine, tri-(2-hexyl)phosphine, tri-(3-hexyl)phosphine, tri-(1-heptyl)phosphine, tri-(2-heptyl)phosphine, tri-(3-heptyl)phosphine, tri-(4-heptyl)phosphine, tri-(1-Octyl)phosphine, tri-(2-octyl)phosphine, tri-(3-octyl)phosphine, tri-(4-octyl)phosphine, tri-(1-CH3(CH2)8)phosphine, tri-(2-CH3(CH2)8)phosphine, tri-(3-CH3(CH2)8)phosphine, tri-(4-CH3(CH2)8)phosphine, tri-(1-CH3(CH2)9)phosphine tri-(2-CH3(CH2)9)phosphine, tri-(3-CH13(CH2)9)phosphine, tri-(4-CH3(CH2)9)phosphine, tri-(5-CH3(CH2)9)phosphine, tri-(1-CH3(CH2)10)phosphine, tri-(2-CH3(CH2)10)phosphine, tri-(3-CH3(CH2)10)phosphine, tri-(4-CH3(CH2)10)phosphine, tri-(5-CH3(CH2)10)phosphine, tri-(1-CH3(CH2)11)phosphine, tri-(2-CH3(CH2)11)phosphine, tri-(3-CH3(CH2)11)phosphine, tri-(4-CH3(CH2)11)phosphine, tri-(5-CH3(CH2)11)phosphine, tri-(6-CH3(CH2)11)phosphine, tri-(1-CH3(CH2)12)phosphine, tri-(2-CH3(CH2)12)phosphine, tri-(3-CH3(CH2)12)phosphine, tri-(4-CH3(CH2)12)phosphine, tri-(5-CH3(CH2)12)phosphine, tri-(6-CH3(CH2)12)phosphine, methyl di-(1-hexyl)phosphine, methyl di-(2-hexyl)phosphine, methyl di-(3-hexyl)phosphine, methyl di-(1-heptyl)phosphine, methyl di-(2-heptyl)phosphine, methyl di-(3-heptyl)phosphine, methyl di-(4-heptyl)phosphine, methyl di-(1-octyl)phosphine, methyl di-(2-octyl)phosphine, methyl di-(3-octyl)phosphine, methyl di-(4-octyl)phosphine, methyl di-(1-CH3(CH2)8)phosphine, methyl di-(2-CH3(CH2)8)phosphine, methyl di-(3-CH3(CH2)8)phosphine, methyl di-(4-CH3(CH2)8)phosphine, methyl di-(1-CH3(CH2)9)phosphine, methyl di-(2-CH3(CH2)9)phosphine, methyl di-(3-CH3(CH2)9)phosphine, methyl di-(4-CH3(CH2)9)phosphine, methyl di-(5-CH3(CH2)9)phosphine, methyl di-(1-CH3(CH2)10)phosphine, methyl di-(2-CH3(CH2)10)phosphine, methyl di-(3-CH3(CH2)10)phosphine, methyl di-(4-CH3(CH2)10)phosphine, methyl di-(5-CH3(CH2)10)phosphine, methyl di-(1-CH3(CH2)11)phosphine, methyl di-(2-CH3(CH2)11)phosphine, methyl di-(3-CH3(CH2)11)phosphine, methyl di-(4-CH3(CH2)11)phosphine, methyl di-(5-CH3(CH2)11)phosphine, methyl di-(6-CH3(CH2)11)phosphine, methyl di-(1-CH3(CH2)12)phosphine, methyl di-(2-CH3(CH2)12)phosphine, methyl di-(3-CH3(CH2)12)phosphine, methyl di-(4-CH3(CH2)12)phosphine, methyl di-(5-CH3(CH2)12)phosphine, methyl di-(6-CH3(CH2)12)phosphine, ethyl di-(1-hexyl)phosphine, ethyl di-(2-hexyl)phosphine, ethyl di-(3-hexyl)phosphine, ethyl di-(1-heptyl)phosphine, ethyl di-(2-heptyl)phosphine, ethyl di-(3-heptyl)phosphine, ethyl di-(4-heptyl)phosphine, ethyl di-(1-octyl)phosphine, ethyl di-(2-octyl)phosphine, ethyl di-(3-octyl)phosphine, ethyl di-(4-octyl)phosphine, ethyl di-(1-CH3(CH2)8)phosphine, ethyl di-(2-CH3(CH2)8)phosphine, ethyl di-(3-CH3(CH2)8)phosphine, ethyl di-(4-CH3(CH2)8)phosphine, ethyl di-(1-CH3(CH2)9)phosphine, ethyl di-(2-CH3(CH2)9)phosphine, ethyl di-(3-CH3(CH2)9)phosphine, ethyl di-(4-CH3(CH2)9)phosphine, ethyl di-(5-CH3(CH2)9)phosphine, ethyl di-(1-CH3(CH2)10)phosphine, ethyl di-(2-CH3(CH2)10)phosphine, ethyl di-(3-CH3(CH2)10)phosphine, ethyl di-(4-CH3(CH2)10)phosphine, ethyl di-(5-CH3(CH2)10)phosphine, ethyl di-(1-CH3(CH2)11)phosphine, ethyl di-(2-CH3(CH2)11)phosphine, ethyl di-(3-CH3(CH2)11)phosphine, ethyl di-(4-CH3(CH2)11)phosphine, ethyl di-(5-CH3(CH2)11)phosphine, ethyl di-(6-CH3(CH2)11)phosphine, ethyl di-(1-CH3(CH2)12)phosphine, ethyl di-(2-CH3(CH2)12)phosphine, ethyl di-(3-CH3(CH2)12)phosphine, ethyl di-(4-CH3(CH2)12)phosphine, ethyl di-(5-CH3(CH2)12)phosphine, ethyl di-(6-CH3(CH2)12)phosphine, 1-propyl di-(1-hexyl)phosphine, 1-propyl di-(2-hexyl)phosphine, 1-propyl di-(3-hexyl)phosphine, 1-propyl di-(1-heptyl)phosphine, 1-propyl di-(2-heptyl)phosphine, 1-propyl di-(3-heptyl)phosphine, 1-propyl di-(4-heptyl)phosphine, 1-propyl di-(1-octyl)phosphine, 1-propyl di-(2-octyl)phosphine, 1-propyl di-(3-octyl)phosphine, 1-propyl di-(4-octyl)phosphine, 1-propyl di-(1-CH3(CH2)8)phosphine, 1-propyl di-(2-CH3(CH2)8)phosphine, 1-propyl di-(3-CH3(CH2)8)phosphine, 1-propyl di-(4-CH3(CH2)8)phosphine, 1-propyl di-(1-CH3(CH2)9)phosphine, 1-propyl di-(2-CH3(CH2)9)phosphine, 1-propyl di-(3-CH3(CH2)9)phosphine, 1-propyl di-(4-CH3(CH2)9)phosphine, 1-propyl di-(5-CH3(CH2)9)phosphine, 1-propyl di-(1-CH3(CH2)10)phosphine, 1-propyl di-(2-CH3(CH2)10)phosphine, 1-propyl di-(3-CH3(CH2)10)phosphine, 1-propyl di-(4-CH3(CH2)10)phosphine, 1-propyl di-(5-CH3(CH2)10)phosphine, 1-propyl di-(1-CH3(CH2)11)phosphine, 1-propyl di-(2-CH3(CH2)11)phosphine, 1-propyl di-(3-CH3(CH2)11)phosphine, 1-propyl di-(4-CH3(CH2)11)phosphine, 1-propyl di-(5-CH3(CH2)11)phosphine, 1-propyl di-(6-CH3(CH2)11)phosphine, 1-propyl di-(1-CH3(CH2)12)phosphine, 1-propyl di-(2-CH3(CH2)12)phosphine, 1-propyl di-(3-CH3(CH2)12)phosphine, 1-propyl di-(4-CH3(CH2)12)phosphine, 1-propyl di-(5-CH3(CH2)12)phosphine, 1-propyl di-(6-CH3(CH2)12)phosphine, 2-propyl di-(1-hexyl)phosphine, 2-propyl di-(2-hexyl)phosphine, 2-propyl di-(3-hexyl)phosphine, 2-propyl di-(1-heptyl)phosphine, 2-propyl di-(2-heptyl)phosphine, 2-propyl di-(3-heptyl)phosphine, 2-propyl di-(4-heptyl)phosphine, 2-propyl di-(1-octyl)phosphine, 2-propyl di-(2-octyl)phosphine, 2-propyl di-(3-octyl)phosphine, 2-propyl di-(4-octyl)phosphine, 2-propyl di-(1-CH3(CH2)8)phosphine, 2-propyl di-(2-CH3(CH2)8)phosphine, 2-propyl di-(3-CH3(CH2)8)phosphine, 2-propyl di-(4-CH3(CH2)8)

phosphine, 2-propyl di-(1-CH3(CH2)9)phosphine, 2-propyl di-(CH3(CH2)9)phosphine, 2-propyl di-(3-CH3(CH2)9)phosphine, 2-propyl di-(4-CH3(CH2)9)phosphine, 2-propyl di-(5-CH3(CH2)9)phosphine, 2-propyl di-(1-CH3(CH2)10)phosphine, 2-propyl di-(2-CH3(CH2)10)phosphine, 2-propyl di-(3-CH3(CH2)10)phosphine, 2-propyl di-(4-CH3(CH2)10)phosphine, 2-propyl di-(5-CH3(CH2)10)phosphine, 2-propyl di-(1-CH3(CH2)11)phosphine, 2-propyl di-(2-CH3(CH2)11)phosphine, 2-propyl di-(3-CH3(CH2)11)phosphine, 2-propyl di-(4-CH3(CH2)11)phosphine, 2-propyl di-(5-CH3(CH2)11)phosphine, 2-propyl di-(6-CH3(CH2)11)phosphine, 2-propyl di-(1-CH3(CH2)12)phosphine, 2-propyl di-(2-CH3(CH2)12)phosphine, 2-propyl di-(3-CH3(CH2)12)phosphine, 2-propyl di-(4-CH3(CH2)12)phosphine, 2-propyl di-(5-CH3(CH2)12)phosphine, 2-propyl di-(6-CH3(CH2)12)phosphine, butyl di-(1-hexyl)phosphine, butyl di-(2-hexyl)phosphine, butyl di-(3-hexyl)phosphine, butyl di-(1-heptyl)phosphine, butyl di-(2-heptyl)phosphine, butyl di-(3-heptyl)phosphine, butyl di-(4-heptyl)phosphine, butyl di-(1-octyl)phosphine, butyl di-(2-octyl)phosphine, butyl di-(3-octyl)phosphine, butyl di-(4-octyl)phosphine, butyl di-(1-CH3(CH2)8)phosphine, butyl di-(2-CH3(CH2)8)phosphine, butyl di-(3-CH3(CH2)8)phosphine, butyl di-(4-CH3(CH2)8)phosphine, butyl di-(1-CH3(CH2)9)phosphine, butyl di-(2-CH3(CH2)9)phosphine, butyl di-(3-CH3(CH2)9)phosphine, butyl di-(4-CH3(CH2)9)phosphine, butyl di-(5-CH3(CH2)9)phosphine, butyl di-(1-CH3(CH2)10)phosphine, butyl di-(2-CH3(CH2)10)phosphine, butyl di-(3-CH3(CH2)10)phosphine, butyl di-(4-CH3(CH2)10)phosphine, butyl di-(5-CH3(CH2)10)phosphine, butyl di-(1-CH3(CH2)11)phosphine, butyl di-(2-CH3(CH2)11)phosphine, butyl di-(3-CH3(CH2)11)phosphine, butyl di-(4-CH3(CH2)11)phosphine, butyl di-(5-CH3(CH2)11)phosphine, butyl di-(6-CH3(CH2)11)phosphine, butyl di-(1-CH3(CH2)12)phosphine, butyl di-(2-CH3(CH2)12)phosphine, butyl di-(3-CH3(CH2)12)phosphine, butyl di-(4-CH3(CH2)12)phosphine, butyl di-(5-CH3(CH2)12)phosphine, butyl di-(6-CH3(CH2)12)phosphine, methyl hexyl heptyl phosphine, methyl hexyl octyl phosphine, ethyl propyl butyl phosphine, ethyl propyl pentyl phosphine, ethyl propyl hexyl phosphine, ethyl propyl heptyl phosphine, ethyl propyl octyl phosphine, ethyl butyl pentyl phosphine, ethyl butyl hexyl phosphine, ethyl butyl heptyl phosphine, ethyl butyl octyl phosphine, ethyl pentyl hexyl phosphine, ethyl pentyl heptyl phosphine, ethyl pentyl octyl phosphine, ethyl hexyl heptyl phosphine, ethyl hexyl octyl phosphine, tri-phenyl phosphine, 1 hexyl di-phenyl phosphine, 2 hexyl di-phenyl phosphine, 3 hexyl di-phenyl phosphine, 1 heptyl di-phenyl phosphine, 2 heptyl di-phenyl phosphine, 3 heptyl di-phenyl phosphine, 4 heptyl di-phenyl phosphine, 1 octyl di-phenyl phosphine, 2 octyl di-phenyl phosphine, 3 octyl di-phenyl phosphine, 4 octyl di-phenyl phosphine, 1 CH3(CH2)8 di-phenyl phosphine, 2 CH3(CH2)8 di-phenyl phosphine, 3 CH3(CH2)8 di-phenyl phosphine, 4 CH3(CH2)8 di-phenyl phosphine, 1 CH3(CH2)9 di-phenyl phosphine, 2 CH3(CH2)9 di-phenyl phosphine, 3 CH3(CH2)9 di-phenyl phosphine, 4 CH3(CH2)9 di-phenyl phosphine, 5 CH3(CH2)9 di-phenyl phosphine, 1 CH3(CH2)10 di-phenyl phosphine, 2 CH3(CH2)10 di-phenyl phosphine, 3 CH3(CH2)10 di-phenyl phosphine, 4 CH3(CH2)10 di-phenyl phosphine, 5 CH3(CH2)10 di-phenyl phosphine, 1 CH3(CH2)11 di-phenyl phosphine, 2 CH3(CH2)11 di-phenyl pheine, 3 CH3(CH2)11 di-phenyl phosphen phopine, 4 CH3(CH2)11 di-phenyl phosphine, 5 CH3(CH2)11 di-phenyl phosphine, 6 CH3(CH2)11 di-phenyl phosphine, CH3(CH2)12 di-phenyl phosphe ine, CH3(CH2)12 phenyl phe, phosphine, 3 CH3(CH2)12 di-phenyl phosphine, 4 CH3(CH2)12 di-phenyl phosphine, 5 CH3(CH2)12 di-phenyl phosphine, 6 CH3(CH2)12 di-phenyl phosphine, di-(1-hexyl)phenyl phosphine, di-(2-hexyl)phenyl phosphine, di-(3-hexyl)phenyl phosphine, di-(1-heptyl)phenyl phosphine, di-(2-heptyl)phenyl phosphine, di-(3-heptyl)phenyl phosphine, di-(4-heptyl)phenyl phosphine, di-(1-octyl)phenyl phosphine, di-(2-octyl)phenyl phosphine, di-(3-octyl)phenyl phosphine, di-(4-octyl)phenyl phosphine, di-(1-CH3(CH2)8)phenyl phosphine, di-(2-CH3(CH2)8)phenyl phosphine, di-(3-CH3(CH2)8)phenyl phosphine, di-(4-CH3(CH2)8)phenyl phosphine, di-(1-CH3(CH2)9)phenyl phosphine, di-(2-CH3(CH2)9)phenyl phosphine, di-(3-CH3(CH2)9)phenyl phosphine, di-(4-CH3(CH2)9)phenyl phosphine, di-(5-CH3(CH2)9)phenyl phosphine, di-(1-CH3(CH2)10)phenyl phosphine, di-(2-CH3(CH2)10)phenyl phosphine, di-(3-CH3(CH2)10)phenyl phosphine, di-(4-CH3(CH2)10)phenyl phosphine, di-(5-CH3(CH2)10)phenyl phosphine, di-(1-CH3(CH2)11)phenyl phosphine, di-(2-CH3(CH2)11)phenyl phosphine, di-(3-CH3(CH2)11)phenyl phosphine, di-(4-CH3(CH2)11)phenyl phosphine, di-(5-CH3(CH2)11)phenyl phosphine, di-(6-CH3(CH2)11)phenyl phosphine, di-(1-CH3(CH2)12)phenyl phosphine, di-(2-CH3(CH2)12)phenyl phosphine, di-(3-CH3(CH2)12)phenyl phosphine, di-(4-CH3(CH2)12)phenyl phosphine, di-(5-CH3(CH2)12)phenyl phosphine, di-(6-CH3(CH2)12)phenyl phosphine, tri-(phenyl methyl)phosphine, tri-(2-methyl phenyl)phosphine, tri-(3-methyl phenyl)phosphine, tri-(4-methyl phenyl)phosphine, tri-(2-ethyl phenyl)phosphine, tri-(3-ethyl phenyl)phosphine, tri-(4-ethyl phenyl)phosphine, tri-(hexene)phosphine, tri-(heptene)phosphine, tri-(octene)phosphine, tri-(heptyl)phosphine, tri-(heptyl)phosphine, tri-(heptyl)phosphine, and tri-(heptyl)phosphine.

Examples of the phosphine oxides correspond to each of the above-listed phosphines. A listing of such oxides can be quickly generated by simply adding the word "oxides" to each of the above listed phosphine species.

Examples of di-phosphonates include: tetra-methyl di-phosphonate, tetra-ethyl di-phosphonate, tetra-(1-propyl)di-phosphonate, tetra-(2-propyl)di-phosphonate, tetra-(1-butyl)di-phosphonate, tetra-(2-butyl)di-phosphonate, tetra-(1-tert-butyl)di-phosphonate, tetra-(2-tert-butyl)di-phosphonate, tetra-(1-pentyl)di-phosphonate, tetra-(2-pentyl)di-phosphonate, tetra-(3-pentyl)di-phosphonate, tetra-(1-hexyl)di-phosphonate, tetra-(2-hexyl)di-phosphonate, tetra-(3-hexyl)di-phosphonate, tetra-(1-heptyl)di-phosphonate, tetra-(2-heptyl)di-phosphonate, tetra-(3-heptyl)di-phosphonate, tetra-(4-heptyl)di-phosphonate, tetra-(1-octyl)di-phosphonate, tetra-(2-octyl)di-phosphonate, tetra-(3-octyl)di-phosphonate, tetra-(4-octyl)di-phosphonate, tetra-(1-CH3(CH2)8)di-phosphonate, tetra-(2-CH3(CH2)8)di-phosphonate, tetra-(3-CH3(CH2)8)di-phosphonate, tetra-(4-CH3(CH2)8)di-phosphonate, tetra-(1-CH3(CH2)9)di-phosphonate, tetra-(2-CH3(CH2)9)di-phosphonate, tetra-(3-CH3(CH2)9)di-phosphonate, tetra-(4-CH3(CH2)9)di-phosphonate, tetra-(5-CH3(CH2)9)di-phosphonate, tetra-(1-CH3(CH2)10)di-phosphonate, tetra-(2-CH3(CH2)10)di-phosphonate, tetra-(3-CH3(CH2)10)di-phosphonate, tetra-(4-CH3(CH2)10)di-phosphonate, tetra-(5-CH3(CH2)10)di-phosphonate, tetra-(1-CH3(CH2)11)di-phosphonate, tetra-(2-CH3(CH2)11)di-phosphonate, tetra-(3-CH3(CH2)11)di-phosphonate, tetra-(4-CH3(CH2)11)di-phosphonate, tetra-(5-CH3(CH2)11)di-phosphonate, tetra-(6-CH3(CH2)12)di-phosphonate, tetra-(3-CH3(CH2)12)di-phosphonate, tetra-(2-CH3(CH2)12)di-phosphonate, tetra-(3-CH3(CH2)12)di-phosphonate, tetra-(4-CH3(CH2)12)di-phosphonate, tetra-(5-CH3(CH2)12)di-phosphonate, tetra-(6-CH3(CH2)12)di-phosphonate, tetra-phenyl di-phosphonate, di-methyl-(di-ethyl)di-phosphonate, di-methyl-(di-phenyl)di-phosphonate, and di-methyl-(di-4-pentene)di-phosphonate.

Examples of pyrophosphate compounds include: tetramethyl pyrophosphate, tetra-ethyl pyrophosphate, tetra-(1-propyl)pyrophosphate, tetra-(2-propyl)pyrophosphate, tetra-(1-butyl)pyrophosphate, tetra-(2-butyl)pyrophosphate, tetra-(1-tert-butyl)pyrophosphate, tetra-(2-tert-butyl)pyrophosphate, tetra-(1-pentyl)pyrophosphate, tetra-(2-pentyl)pyrophosphate, tetra-(3-pentyl)pyrophosphate, tetra-(1-hexyl)pyrophosphate, tetra-(2-hexyl)pyrophosphate, tetra-(3-hexyl)pyrophosphate, tetra-(1-heptyl)pyrophosphate, tetra-(2-heptyl)pyrophosphate, tetra-(3-heptyl)pyrophosphate, tetra-(4-heptyl)pyrophosphate, tetra-(1-octyl)pyrophosphate, tetra-(2-octyl)pyrophosphate, tetra-(3-octyl)pyrophosphate, tetra-(4-octyl)pyrophosphate, tetra-(1-CH3(CH2)8)pyrophosphate, tetra-(2-CH3(CH2)8)pyrophosphate, tetra-(3-CH3(CH2)8)pyrophosphate, tetra-(4-CH3(CH2)8)pyrophosphate, tetra-(3-CH3(CH2)9)pyrophosphate, tetra-(2-CH3(CH2)9)pyrophosphate, tetra-(3-CH3(CH2)9)pyrophosphate, tetra-(4-CH3(CH2)9)pyrophosphate, tetra-(5-CH3(CH2)9)pyrophosphate, tetra-(4-CH3(CH2)10)pyrophosphate, tetra-(2-CH3(CH2)10)pyrophosphate, tetra-(3-CH3(CH2)10)pyrophosphate, tetra-(4-CH3(CH2)10)pyrophosphate, tetra-(5-CH3(CH2)10)pyrophosphate, tetra-(4-CH3(CH2)11)pyrophosphate, tetra-(2-CH3(CH2)10)pyrophosphate, tetra-(3-CH3(CH2)11)pyrophosphate, tetra-(4-CH3(CH2)11)pyrophosphate, tetra-(5-CH3(CH2)11)pyrophosphate, tetra-(6-CH3(CH2)11)pyrophosphate, tetra-(5-CH3(CH2)12)pyrophosphate, tetra-(2-CH3(CH2)12)pyrophosphate, tetra-(3-CH3(CH2)12)pyrophosphate, tetra-(4-CH3(CH2)12)pyrophosphate, tetra-(5-CH3(CH2)12)pyrophosphate, tetra-(6-CH3(CH2)12)pyrophosphate, tetra-phenyl pyrophosphate, di-methyl-(di-ethyl)pyrophosphate, di-methyl-(di-phenyl)pyrophosphate, and di-methyl-(di-4-pentene)pyrophosphate.

Examples of additional phosphorous containing compounds include those described in "Phosphorus Chemistry in Everyday Living" by A. Toy and E. Walsh (second edition, 1987, ACS, Washington, DC. Examples include:
pyrophosphates, phosphonites, phosphorothioates, phosphonothioates, phosphonates, phosphorodithioates, bis-phosphorodithioates, phosphonodithioates, phosphoramidothioates, and pyrophosphoramide. Specific species include: tetra-propyl dithiono-pyrophosphate, tetra-ethyl dithiono-pyrophosphate, O-ethyl O-[2-(di-isopropyl amino)ethyl]methylphosphonite, O,O-dimethyl O-p-nitrohenyl phosphorothioate, O,O-diethyl O-p-nitrophenyl phosphorothioate, O,O-dimethyl O-(4-nitro-m-tolyl)phosphorothioate, O-ethyl O-p-nitrophenyl phenylphosphono-thioate, O,O-diethyl O-(3,5,6-trichloro-2-pyridyl)phosphorothioate, O,O-diethyl O-(2-isopropyl-6-methyl-4-pyrimidinyl) phosphorothioate, O,O-diethyl O-[4-methylsulfmyl] phenyl]phosphorothioate, O,O-dimethyl O-[3-methyl-4-(methyl thio)phenyl]phosphorothioate, O,O-dimethyl (2,2,2-trichloro-1-hydroxy-ethyl) phosphonate, 2,2-di-chlorovinyl di-methyl phosphate, 1,2-di-bromo-2,2-di-chloroethyl dimethyl phosphate, 2-chloro-1-(2,3,4-trichloro-phenyl)vinyl dimethyl phosphate, O-(4-bromo-2-chloro-phenyl) O-ethyl S-propyl phosphoro-thioate, O-ethyl-O-[4-(methylthio)phenyl] S-propyl phosphorodithioate, O-ethyl S,S-di-propyl phosphorodithioate, diethyl mercapto-succinate, S-ester with O,O-dimethyl phosphorodithioate, S-[(1,1-dimethyl-ethyl)-thio)methyl] O,O-di ethyl phosphorodithioate, O,O-dimethyl S-phthalimido-methyl phosphorodithoate, O,O-dimethyl S-4-oxo-1,2,3-benzotriazin 3(4H)-ylmethyl phosphorodithioate, O,O,O',O"-tetraethyl S,S'-methlene bis-phosphorodithioate, S-[(6-chloro-2-oxo-3-(2H)-benzoxazolyl) methyl] O,O-di-ethyl phosphorodithionate, S-[(p-chlorophenyl-thio)methyl] O,O-diethyl phosphorodithioate, 1,4-p-dioxane-2,3,-di-thiol S,S-bis (O,O-diethyl phosphorodithioate, O-ethyl S-phenyl Ethyl-phosphonodithioate, O,S-dimethyl phosphoramidothioate, O,S-dimethyl acetyl-phosphoramidothioate, 1-methylethyl 2-[[ethoxy[(1-methylethyl) amino]phosphinothioy]oxy]benzoate, dimethyl dichlorovinyl phosphate, O,O-diethyl S-ethyl-thiomethyl phosphorodithioate, O,O-dimethyl S-(methyl-carbamoylmethyl)phosphorodithioate, ethyl 3-methyl-4-(methylthio)phenyl (1-methylethyl)-phosphoroamidate, O,O-dimethyl O-[2-(methycarbanmoyl)-1-methyl-vinyl]phosphate, and octamethylpyrophosphoramide.

Specific examples of phosphinates include: ethyl pentyl phosphinate, ethyl hexyl phosphinate, ethyl heptyl phosphinate, ethyl octyl phosphinate, ethyl decyl phosphinate, ethyl phenyl phosphinate, butyl pentyl phosphinate, butyl hexyl phosphinate, butyl heptyl phosphinate, pentyl dibutyl phosphinate, hexyl dibutyl phosphinate, and heptyl dibutyl phosphinate.

Examples of phosphinic acids include: pentyl phosphinic acid, hexyl phosphinic acid, heptyl phosphinic acid, octyl phosphinic acid, decyl phosphinic acid, phenyl phosphinic acid, di pentyl phosphinic acid, di heptyl phosphinic acid, di decyl phosphinic acid, di phenyl phosphinic acid, phenyl hexyl phosphinic acid, and pentyl decyl phosphinic acid.

Examples of phosphinous acids include: monopentyl phosphinous acid, monohexyl phosphinous acid, monoheptyl phosphinous acid, monooctyl phosphinous acid, monodecyl phosphinous acid, monophenyl phosphinous acid, dipropyl phosphinous acid, dipentyl phosphinous acid, diheptyl phosphinous acid, didecyl phosphinous acid, diphenyl phosphinous acid, and propyl decyl phosphinous acid.

Examples of phosphonates include: hexyl pentyl phosphonate, heptyl pentyl phosphonate, octyl pentyl phosphonate, decyl pentyl phosphonate, phenyl pentyl phosphonate, dibutyl pentyl phosphonate, dihexylphosphonate, heptylphosphonate, pentylphosphonate, octylphosphonate, and phenylphosphonate.

Examples of phosphonic acids include: pentyl phosphonic acid, hexyl phosphonic acid, heptyl phosphonic acid, octyl phosphonic acid, decyl phosphonic acid, phenyl phosphonic acid, methyl pentyl phosphonic acid, methyl phenyl phosphonic acid, pentylphosphonic acid, octylphosphonic acid, phenylphosphonic acid, and pentyl octylphosphonic acid.

Examples of phosphonites include: ethyl pentyl phosphonite, ethyl hexyl phosphonite, ethyl heptyl phosphonite, ethyl octyl phosphonite, ethyl decyl phosphonite, ethyl phenyl phosphonite, butyl pentyl phosphonite, butyl hexyl phosphonite, butyl heptyl phosphonite, diethyl pentyl phosphonite, diethyl hexyl phosphonite, and diethyl heptyl phosphonite.

Examples of phosphonous acids include: 1-pentyl phosphonous acid, 2-pentyl phosphonous acid, 3-pentyl phosphonous acid, 1-hexyl phosphonous acid, 2-hexyl phosphonous acid, 3-hexyl phosphonous acid, 1-heptyl phosphonous acid, 2-heptyl phosphonous acid, 3-heptyl phosphonous acid, 4-heptyl phosphonous acid, octyl phosphonous acid, decyl phosphonous acid, and phenyl phosphonous acid.

A complex between the phosphorous containing compound and the acyl halide is formed prior to or during the reaction between the acyl halide and amine. The phosphorous containing compounds may be directly added to the acyl halide solution prior to contacting the acyl halide and amine solutions, thereby permitting sufficient opportunity for the formation of a complex prior to reaction between the amine and acyl halide.

Suitable co-solvents may be chosen among solvents having the general formula $R_1—O—R_2$, silanes and aromatic compounds. The substituent $R_1$ may selected from the group comprising a straight or branched C1-C6 lower alkyl, C1-C6 lower alkenyl or C1-C6 lower alkynyl, optionally substituted with 1 to 3 substituents selected among the groups methyl, ethyl, propyl, flour, chlorine, bromine, iodine, hydroxy, aldehyde, carboxylic acid, amine, amide, nitril, methoxy, ethoxy, propoxy, isopropoxy, and any combination thereof. In particular $R_1$ may be selected among methyl, ethyl, n-propyl, isopropyl, n-butyl, sec-butyl, isobutyl, tert-butyl, n-pentyl, tert-pentyl, neopentyl, isopentyl, sec-pentyl, 3-pentyl, sec-isopentyl, n-hexyl, isohexyl, 3-methyl pentyl, neohexyl, and 2,3 dimethyl butyl.

The substituent $R_2$ may be selected from a group comprising a straight or branched C1-C6 lower alkyl, C1-C6 lower alkenyl, C1-C6 lower alkynyl, carbonyl C1-C6 lower alkyl, carbonyl C1-C6 lower alkenyl, carbonyl C1-C6 lower alkynyl, optionally substituted with 1 to 3 substituents selected among the groups methyl, ethyl or propyl, flour, chlorine, bromine, iodine, hydroxy, aldehyde, carboxylic acid, amine, amide, nitril, methoxy, ethoxy, propoxy, isopropoxy, and any combination thereof. In particular R2 may be selected among methyl, ethyl, n-propyl, isopropyl, n-butyl, sec-butyl, isobutyl, tert-butyl, n-pentyl, tert-pentyl, neopentyl, isopentyl, sec-pentyl, 3-pentyl, sec-isopentyl, n-hexyl, isohexyl, 3-methyl pentyl, neohexyl, 2,3 dimethyl butyl, formyl, acetyl, propionyl, n-butanoyl, isobutanoyl, n-pentanoyl, isopentanoyl, sec-pentanoyl, tert-pentanoyl, n-hexanoyl, isohexanoyl, sec-hexanoyl, 3-methyl pentanoyl, neohexanoyl, and 2,3 dimethyl butanoyl.

Preferred co-solvents include ethylacetate, diethyl ether, and ethyl formate.

Other suitable co-solvents include silanes and aromatic compounds. The silane may be selected from a group of compounds having the general formula $X_3—Si—R^1$, in which X is a halogen independently selected amount the group consisting of F, Cl, Br, and I, and $R^1$ is as defined above. The aromatic compound generally include an aromatic ring structure, including an aromatic hetero-ring structure. In an embodiment, the aromatic compound comprises a benzene ring optionally substituted with 1 to 5 substituents selected among the group consisting of methyl, ethyl, propyl, flour, chlorine, bromine, iodine, hydroxy, aldehyde, carboxylic acid, amine, amide, nitril, methoxy, ethoxy, propoxy, isopropoxy, and any combination thereof.

Suitably, the co-solvent is not an alkane, such as a C5-C12 alkane.

The main solvent for the organic phase may be selected from a wide group of compounds. Suitable organic solvents are, for example, one or more of the following non-polar solvents such as hydrocarbons, which may be unsubstituted or substituted. Non-polar solvents include aromatic hydrocarbons, for example mono- or polyalkyl-substituted benzenes, such as toluene, xylenes, mesitylene, ethylbenzene, or mono- or polyalkyl-substituted naphthalenes, such as 1-methylnaphthalene, 2-methylnaphthalene or dimethylnaphthalene, or other benzene-derived aromatic hydrocarbons, such as indane or Tetralin or mixtures thereof. Non-polar solvents also include aliphatic hydrocarbons, for example straight-chain aliphatic compounds of the formula $C_nH_{2n+2}$, in which n=5-12 or branched aliphatics. Suitable example of straight-chain or branched aliphatic compounds include pentane, hexane, heptane, octane, nonane, decan, undecane, dodecane, 2-methylbutane (iso-pentane), 2,2,4-trimethylpentane (iso-octane), iso-hexane, iso heptane, iso-nonane, iso-dodecane, iso-undecane, iso-dodecane or combinations thereof. Non-polar aliphatic solvents also include cyclic, optionally alkyl-substituted aliphatics, such as cyclohexane or methylcyclopentane; or mixtures thereof. Non-polar aliphatic solvents are available commercially as the Exxsol® D series, Isopar® series or Bayol® series. A preferred non-polar aliphatic solvent includes Isopar® E, having a distillation range of 115-140° C. and an aromatic content of less than 0.002% by weight. Isopar® E mainly comprises C7 to C10 alkanes. Another suitable non-polar aliphatic solvent is Isopar® C having a distillation range of 99-104° C. and a aromatics content of less than 0.001.

Other organic solvents for consideration includes mixtures of aromatic and aliphatic hydrocarbons, such as solvents of the Solvesso® series, for example Solvesso® 100, Solvesso® 150 or Solvesso® 200 (ExxonMobil Chemicals); of the Solvarex®/Solvaro® series (TotalFinaElf); or the Caromax® series, for example Caromax® 28 (Petrochem Carless).

After the polyfunctional amine monomer of the aqueous phase has been allowed to react with the poly functional acyl halide monomer of the organic phase for the formation of a cross-linked polyamide thin composite layer on the support membrane, the solvents and co-solvents are generally allowed to leave the cross-linked polyamide layer by dissolution, rinsing, or washing. In a certain embodiment, the solvents and co-solvents are removed by maintaining the semi-permeable membrane in a bath for a certain time and then allow semi-permeable membrane to dry.

While the membrane is expected to function for any semi-permeable membrane described above and capable of performing a forward osmosis process, the water flux generally becomes more efficient when aquaporin water channels are incorporated into the TFC layer. Aquaporin water channels are transmembrane proteins widely occurring in nature for selective transportation of water in or out of cells. In an industrial setting, the aquaporin water channels in a semi-permeable membrane ensure the flow of water by osmosis, while other solutes in the solution are rejected. The presence of active aquaporin water channels thus assists the semi-permeable membrane rejecting solutes and in promoting the penetration of water through the membrane.

The aquaporin water channels are incorporated in the membrane in the active conformation for at least a significant amount of the molecules. According to an aspect of the invention, the activity of the aquaporin water channels is maintained when the aquaporin water channels are assembled in a nanostructure comprising polyalkyleneimine, such as polyethyleneimine. As explained in further detail in WO17137361, which is incorporated herein in its entirety, polyalkyleneimine, such as polyethyleneimine (PEI), form self-assembled nanostructures with transmembrane proteins, such as aquaporin water channels. The nanostructures ensure that at least a part of the aquaporin water channels remain active even after incorporation into the TFC layer. It is currently believed that the polymer interacts with the transmembrane protein to prevent it from reacting with monomers participating in the formation of a TFC layer. Furthermore, it is currently believed that the PEI of the aquaporin nanoparticle react with the PAI and thus become integrated in gutter layer.

Generally, the PEI is a substantially linear or branched polymer having an average molecular weight of between about 2,000 Da to about 10,000 Da, such as between about 3,000 Da to about 5,000 Da. It is currently believed that the relatively short polymer interacts with the transmembrane protein to prevent it from reacting with monomers participating in the formation of a TFC layer, while at the same time not substantially inhibiting the interaction with water.

To prevent aggregation of aquaporin water channels, it may be an advantage to have the aquaporin water channel solubilized in a detergent prior to the assembling in a nanostructure comprising polyalkyleneimine. Due to the natural occurrence of the aquaporin water channel in the cell membrane, the protein displays a hydrophobic domain. It is believed that the hydrophobic domain of a detergent interacts with the hydrophobic domain of the aquaporin water channel, thereby forming a solubilized protein. While the aquaporin water channel may be solubilized by a number of detergents, it is currently preferred to use a detergent selected from the group consisting of LDAO, OG, DDM or a combination thereof.

In another embodiment of the invention the aquaporin water channels are provided in a vesicle prior to the incorporation in the TFC layer. Vesicles are the natural environment for the aquaporin water channels and the vesicles may be formed by a number of different membrane forming materials, including the naturally occurring phospholipids. In a certain embodiment of the invention the vesicle is formed of an amphiphilic diblock copolymer, such as poly (2-methyloxazoline)-block-poly(dimethyl siloxane) diblock copolymer (PMOXA-PDMS) and a reactive end group functionalized poly(dimethyl siloxane) (PDMS).

The two blocks of the PMOXA-PDMS diblock co-polymer may be of different lengths. To obtain sufficient stability of the vesicle the PMOXA-PDMS diblock co-polymer is typically selected from the group consisting of PMOXA10-40-PDMS25-70 and mixtures thereof.

Experiments have shown that a mixture of different PMOXA-PDMS diblock co-polymers shows higher robustness. In a preferred embodiment, the vesicles therefore comprise at least a first amphiphilic diblock copolymer of the general formula PMOXA10-28-PDMS25-70 and a second amphiphilic diblock copolymer of the general formula PMOXA28-40-PDMS25-70. The weight proportion between the first and the second amphiphilic diblock copolymer is usually in the range of 0.1:1 to 1:0.1. The concentration of amphiphilic diblock copolymer in the liquid composition is generally in the range of 0.1 to 50 mg/ml, such as 0.5 to 20 mg/ml, and preferably 1 to 10 mg/ml.

The reactive end group functionalised PDMS (reactive end group functionalized poly(dimethyl siloxane)) of the vesicle may be functionalized with one or more of amine, carboxylic acid, and/or hydroxy groups. In a certain aspect of the invention the reactive end group functionalised PDMSe-f is bis(amino alkyl), bis(hydroxyalkyl), or bis (carboxylic acid alkyl) terminated PDMSe-f, such as poly (dimethyl siloxane), bis(3-aminopropyl) or poly(dimethyl siloxane), bis(3-hyroxypropyl). Suitably, the integer e is selected in the range of 20 to 40, such as 30 and the integer f is selected from the range of 40 to 80, such as 50. Furthermore, the reactive end group functionalised PDMSe-f may be selected from the group consisting of H2N-PDMS30-50, HOOC-PDMS30-50, and HO-PDMS30-50 and mixtures thereof. Prior to the incorporation of the vesicles with aquaporin water channels, the vesicles may be present in a liquid composition and the amount of PDMS is preferably from about 0.05% to about 1% v/v.

The vesicle of the invention may further contain about 1% v/v to about 12% v/v of triblock copolymer of the PMOXAa-b-PDMSc-d-PMOXAa-b type to increase its integrity. Typically, said vesicle comprises from about 8% v/v to about 12% v/v of triblock copolymer of the PMOXAa-b-PDMSc-d-PMOXAa-b type. The triblock copolymer of the PMOXAa-b-PDMSc-d-PMOXAa-b type is typically selected from PMOXA10-20-PDMS25-70-PMOXA10-20.

The vesicle of the invention may further comprise a flux improving agent to increase either the water flux or decrease the reverse salt flux. The flux improving agent may be selected among a large group of compounds by is generally preferred as alkylene glycol monoalkyl ether alkylate, beta cyclodextrin, or polyethylene glycol (15)-hydroxy stearate. The flux increasing agent is usually present in an amount of 0.1% to 1% by weight of the liquid composition.

The vesicle of the invention may be present in a liquid composition before immobilization in a membrane, such as a TFC layer provided on a support membrane. The liquid composition may comprise a buffer to stabilize the vesicles. Before the aquaporin water channels are mixed with the other constituents, suitably the transmembrane protein is solubilized in a detergent. The vesicles in the liquid composition may further comprise a detergent or a surfactant. The detergent may be selected from the group consisting of lauryl dimethylamine N-oxide (LDAO), octyl glucoside (OG), dodecyl maltoside (DDM) or combinations thereof.

Without wishing to be bound by any particular theory, it is believed that the vesicles containing free available reactive groups on the surface will be not only physically incorporated or immobilised in (adsorbed), but, in addition, chemically bound in the TFC layer, because the reactive free end groups, such as amino groups, hydroxyl groups and carboxyl groups, will participate in the interfacial polymerization reaction with the acyl chloride, such as a trimesoyl chloride (TMC). In this way, it is believed that vesicles will be covalently bound in the TFC layer, leading to relatively higher vesicle loading and thus higher water flux through the membranes. Furthermore, it is currently believed that the free end groups, such as amino groups or hydroxyl groups may react with carbonyl groups of the PAI to form a covalent connection between the vesicle and the support hollow fiber membrane. In addition, it is believed that the covalent coupling of vesicles in the TFC layer results in higher stability and/or longevity of the aquaporin water channels and the vesicles containing aquaporin water channels when incorporated in the selective membrane layer.

The vesicles may be prepared in a liquid composition incorporating the aquaporin water channels, comprising the step of stirring a mixture of a solution of an amphiphilic diblock copolymer of the PMOXAa-b-PDMSc-d type, 0.05% to about 1% of reactive end group functionalised PDMSe-f, and aquaporin water channels. To obtain the best result, the stirring is continued for 12-16 hours.

The preparation of a thin film composite layer immobilizing vesicles incorporating the aquaporin water channels on a porous substrate membrane comprises the steps of providing a mixture of vesicles in a liquid composition prepared as disclosed above, and a di-amine or tri-amine compound, covering the surface of a porous support membrane with the mixture, applying a hydrophobic solution comprising an acyl halide compound, and allowing the aqueous solution and the hydrophobic solution to perform an interfacial polymerization reaction to form the thin film composite layer. In a certain embodiment of the invention, the hydrophobic solution further comprises a TFC layer modifying agent in an amount of 0.1 to 10% by volume. The TFC layer modifying agent has the purpose to increase the water flow and/or the rejection of solutes. In a suitable embodiment, the TFC layer modifying agent is a C3 to C8 carbonyl compound. As an example, the TFC layer modifying agent is selected among the group consisting of diethylene ketone, 2-pentanone, 5-pentanone, and/or cyclopentanone.

The porous support membrane may be a hollow fiber membrane or a flat sheet membrane. Currently, a flat sheet membrane is suitable and may be used for the production of various modules like plate-and-frame modules or spiral-wound modules.

For the purposes herein the term "semi-permeable membrane" includes selectively permeable membranes and semi-permeable membranes for water filtration and water separation, such as asymmetric membranes comprising a porous support membrane having a selective layer formed on one side, such as a thin crosslinked aromatic polyamide layer or. The other side may be reinforced by a woven or non-woven layer or mesh typically made of polyester fibers.

In addition, the semi-permeable membrane of the invention is useful in a method for the concentration of a product solution, said method comprising utilizing a separation membrane of the invention mounted in a filter housing or module to extract water from the product solution, e.g. by forward osmosis.

In an aspect of the invention it includes a hollow fiber (HF) module having a bundle of hollow fiber membranes modified with a selective layer of the invention. Preferably, the selective layer comprises a thin film composite (TFC) layer formed on the inside surface of the fibers through an interfacial polymerization reaction.

The separation membrane of the invention may additionally be useful in a method for the production of salinity power using pressure retarded osmosis, said method comprising utilizing said separation membrane to increase hydrostatic pressure, and using the increase in hydrostatic pressure as a source of salinity power, cf. WO2007/033675 and WO2014128293 (A1).

The term "aquaporin" as used herein includes a functional natural or synthetic aquaporin or aquaglyceroporin water channel, such as aquaporin Z (AqpZ), GlPf, SoPIP2;1, aquaporin 1 and/or aquaporin 2. Aquaporin water channels include bacterial aquaporins and eukaryotic aquaporins, such as yeast aquaporins, plant aquaporins and mammalian aquaporins, as well as related channel proteins, such as aquaglyceroporins. Examples of aquaporins and aquaglyceroporins include: prokaryotic aquaporins such as AqpZ; mammalian aquaporins, such as Aqp1 and Aqp2; plant aquaporins, such as plasma intrinsic proteins (PIP), tonoplast intrinsic proteins (TIP), nodulin intrinsic proteins (NIP) and small intrinsic proteins (SIP), e.g. SoPIP2;1, PttPIP2;5 and PtPIP2;2; yeast aquaporins, such as AQY1 and AQY2; and aquaglyceroporins, such as GlpF and Yfl054. Aquaporin water channel proteins may be prepared according to the methods described herein or as set out in Karlsson et al. (FEBS Letters 537: 68-72, 2003) or as described in Jensen et al. US 2012/0080377 A1 (e.g. see Example 6).

Examples of semi-permeable membranes are nanofiltration (NF) membranes, forward osmosis (FO) membranes and reverse osmosis (RO) membranes. Flat sheet TFC membranes are typically made by depositing a polyamide layer on top of a polyethersulfone or polysulfone porous layer on top of a non-woven or woven fabric support. The polyamide rejection layer is formed through interfacial polymerization of an aqueous solution of an amine with a solution of an acid chloride in an organic solvent. TFC membranes may be produced as described in WO 2013/043118 (Nanyang Technological University & Aquaporin A/S).

"Thin-film-composite" or (TFC) membranes as used herein may be prepared using an polyfunctional amine reactant, preferably an aromatic amine, such as a diamine or triamine, e.g. 1,3-diaminobenzene (m-Phenylenediamine, >99% pure, available from from Sigma-Aldrich) in an aqueous solution, and an polyfunctional acyl halide reactant, such as a di- or triacid chloride, preferably an aromatic acyl halide, e.g. benzene-1,3,5-tricarbonyl chloride (CAS No. 84270-84-8, trimesoyl chloride (TMC) available from Sigma-Aldrich) dissolved in an organic solvent, where said reactants combine in an interfacial condensation polymerization reaction, cf. Khorshidi et al. (2016) Scientific Reports 6, Article number: 22069, and U.S. Pat. No. 4,277,344 which describes in detail the formation of a composite membrane comprising a polyamide laminated to a porous membrane support, at the surface of the porous support membrane, e.g. a polyethersulfone membrane.

Forward osmosis (FO) or direct osmosis is an osmotic process that uses a selective and permeable membrane to effect separation of water from dissolved solutes. The driving force for this separation is an osmotic pressure gradient between a solution of high concentration, herein referred to as the draw and a solution of lower concentration, referred to as the feed. The osmotic pressure gradient induces a net flow of water through the membrane into the draw, thus effectively concentrating the feed. The draw solution can consist of a single or multiple simple salts or can be a substance specifically tailored for forward osmosis applications. The feed solution can be a dilute product stream, such as a beverage, a waste stream or seawater.

Most of the applications of FO, thus fall into three broad categories: product concentration, waste concentration or production of clean water as a bi-product of the concentration process. Membranes are useful in all types of forward osmosis processes and may be specifically adapted for each forward osmosis type.

The term "reverse osmosis" (RO) as used herein refers to when an applied feed water pressure on a selectively permeable membrane is used to overcome osmotic pressure. Reverse osmosis typically removes many types of dissolved and suspended substances from feed water, including bacteria, and is used in both industrial processes and in the production of potable water. During the RO process, the solute is retained on the pressurized side of the membrane and the pure solvent, the permeate, passes to the other side. Selectivity specifies that the membrane does not allow larger molecules or ions through its pores (holes), while allowing smaller components of the solution (such as solvent molecules) to pass freely. Low pressure reverse osmosis (LPRO) membranes typically operate at a feed water pressure of from about <5 bar and up to a maximum operating pressure of about 25 bar 15 specific flux LMH/bar. LPRO performed at the lower feed pressure ranges, e.g. 2 to 5 bar is sometimes designated ultra-low pressure reverse osmosis. LPRO membranes known in the art have typical operating limits for feed water temperature of about 45° C., feed water pH in the range of 2 to 11, and chemical cleaning in the range of pH 1 to 12.

The present invention is further illustrated with reference to the following non-limiting examples

EXAMPLES 1.1: Production of the Support Membrane

A dope was prepared of 17% polysulfone (Solvay P3500 MB7 LCD) dissolved in 83% DMF (N,N-Dimethylformamide) obtained from TACT Chemie. The dope was mixed at a mixing speed of 90 rpm in a closed container at 45° C. for 8 hours for obtaining a uniform viscosity.

The dope was casted on a non-woven polyester sheet (model PMB-SKC) obtained from Mitsubishi in a knife over roll casting mode using a casting gap of 230 μm. After an exposure time 1.9 s a phase inversion was performed by quenching in water at 13° C. for 16 s. Subsequently the support membrane was washed in water at 60° C. for 120 s. A thickness of about 130 μm was obtained.

1.2: Production of Aquaporin Water Channel

Expression of histidine tagged aquaporin from *Oryza sativa Japonica* (Japanese Rice) in *Escherichia coli* and its purification using immobilized metal affinity chromatography (IMAC) The gene encoding aquaporin from *Oryza sativa Japonica* (UNIPROT: A3C132) was codon optimized using Geneart's (Subsidiary of Thermo Fischer Scientific) service for improving expression in *E. coli*. The resulting gene was synthesized with the addition of ten histidine encoding codons C-terminally, along with flanking NdeI/XhoI restriction sites N-terminally and C-terminally, respectively (Gene ID: aquaporin *Oryza sativa Japonica*). The synthetic gene fragment was digested with NdeI/XhoI restriction enzymes and ligated to NdeI/XhoI—digested and purified vector pUP1909 fragment. The resulting ligation mixture was transformed into *Escherichia coli* DH10B and kanamycin resistant transformants were selected on LB agar plates with kanamycin. Transformants were confirmed by sequencing of the genetic construct. Isolated vector DNA was subsequently transferred to the production host, *Escherichia coli* BL21.

In order to heterologously express aquaporin in *E. coli*, the production host was grown in minimal medium consisting of 30 g/L Glycerol, 6 g/L (NH4)2HPO4, 3 g/L KH2PO4, 5 g/L NaCl, 0.25 g/L MgSO4·7H2O, 0.4 g/L Fe(III)citrate and 1 mL/L sterile filtered trace metal solution. The trace metal solution consisted of 1 g/L EDTA, 0.8 g/L CoCl2·6H2O, 1.5 MnCl2·4H2O, 0.4 g/L CuCl2·2H2O, 0.4 g/L H3BO3, 0.8 g/L Na2MoO4·2H2O, 1.3 g/L Zn(CH3COO)2·2H2O. After inoculation and overnight growth, additional 0.25 g/L MgSO4·7H2O was added.

*E. coli* was cultivated in 3 L Applikon Bioreactors with ez-Control in a batch fermentation process. Protein production was induced by addition of IPTG to a final concentration of 0.5 mM at an optical density (OD 600 nm) of approximately 30. The culture was induced for approximately 24 hours and the bacterial cells were harvested with centrifugation at 5300 g for 20 min.

The pellets comprising the *E. coli* cells were resuspended in buffer (aqueous solution of the protease inhibitor PMSF and EDTA) and homogenized at 1000 bar in a Stansted nm-GEN 7575 homogenizer. The temperature was maintained around 10-15° C. The mixture was centrifuged at a maximum speed of 5300 g for 30 minutes. The pellet contains the membrane protein and the supernatant is discarded.

The pellet was resuspended in a 0.9% sodium chloride solution to obtain a total protein concentration of approximately 50 mg/ml. Solubilization of the membrane protein was performed by adding 28 L TRIS binding buffer and 4.5 liter 5% n-lauryl dimethylamine N-oxide (LDAO) to 5 L of the resuspended pellet material. At room temperature and gentle stirring the mixture was allowed to incubate for 2 to 24 hours.

After the solubilization process the mixture was centrifuged in 2 L containers at 5300 g for 90 minutes. The supernatant was recovered and the LDAO concentration was adjusted to 0.2% by addition of dilution buffer.

After solubilization and clarification, the protein was captured using IMAC and eluted in Elution buffer containing 1000 mM imidazole and 0.2% w/v LDAO. The elution fractions were analyzed by SDS Page and only revealed a single major band which migrated at 27 kDa which corresponds to the size of aquaporin from Japanese rice. Furthermore, the result was confirmed by comparison to a negative control purification from *E. coli* transformed with an empty vector. The negative control resulted in no purified protein.

Western blot analysis with antibodies (TaKaRa Bio) specific for the histidine-tag resulted as expected in a clear signal from the purified protein and no signal from the negative control confirming the origin of the purified protein as the histidine tagged membrane protein.

A stock solution was prepared by adjusting the protein concentration to 5 mg/ml by adding ice cold imidazole-free buffer containing 2% LDAO. Finally, the aquaporin stock solution was sterilized by filtration through 0.45 μM sterilized cup and stored at 4° C. in refrigerator for use within a month or else stored at −80° C. in a freezer.

1.3: Production of Aquaporin Formulation
1. Prepare a 0.5% by weight Kolliphor® HS 15 (polyethylene glycol (15)-hydroxystearate) (KHS) solution by dissolving 5 g KHS in 1l PBS (prepared by dissolving 8 g NaCl, 0.2 g KCl, 1.44 g Na2HPO4 and 0.24 g of KH2PO4 in 800 mL MiliQ purified H2O, adjusting the pH to 7.2 with HCl and completing the volume to 1 L).
2. Prepare a 0.05% by weight LDAO solution in PBS by dissolving 0.05 g LDAO in 100 mL PBS.
3. In the preparation vessel, weigh 0.5 g poly(2-methyloxazoline)-block-poly(dimethylsiloxane) diblock copolymer (PDMS$_{65}$PMOXA$_{24}$) per L of prepared formulation.
4. In the same preparation vessel weigh poly(2-methyloxazoline)-block-poly(dimethylsiloxane) diblock copolymer (PDMS65PMOXA32 to reach a concentration on 0.5 g/L of prepared formulation (1:1 weight ratio PDMS$_{65}$PMOXA$_{24}$ and PDMS$_{65}$PMOXA$_{32}$).
5. In the same preparation vessel, add poly(2-methyloxazoline)-block-poly(dimethylsiloxane)-block-poly-(2-methyloxazoline) triblock copolymer PMOXA$_{12}$PDMS$_{65}$PMOXA$_{12}$ to reach a concentration of 0.12 g/L of prepared formulation.
6. Add LDAO 0.05% prepared in step 2 in the proportion 100 mL/L of prepared formulation.
7. Add the bis(3-aminopropyl) terminated poly(dimethylsiloxane) having a molecular weight of 2500 Da to reach a final concentration of 0.1%.
8. Add aquaporin stock solution to reach a concentration of 5 mg/L of prepared formulation and a 1/400 protein:polymer ratio.

9. Add 3% by weight KHS solution prepared in step 1 to reach the desired volume of prepared formulation subtracting the volumes of LDAO, bis(3-aminopropyl) terminated poly(dimethylsiloxane) and aquaporin added in step 6 and 8.
10. Stir the mixture from step 9 overnight at 170 rotations per minute (not more than 20 hours) at room temperature to achieve the formulation.
11. Next morning take the prepared formulation obtained in the sequence of steps 1 to 10 and filter it through 200 nm pore size filters to sterilize it, put it in a closed sealed bottle and keep it at room temperature for not more than 12 months.

1.4: Production of TFC Layer on the Support Membrane
a. Prepare an aqueous solution by mixing in DI water:
 i. 2.5% MPD
 ii. 2.5% ε-caprolactam (CAP)
 iii. 5% aquaporin formulation
b. Prepare an organic solution by mixing in Isopar E:
 i. 0.15% TMC
 ii. 0% or 1.25% tributyl phosphate (TBP)
 iii. 0%, 0.5%, 1.0% or 2.0% co-solvent
c. TFC formation
 i. Dipping support membrane in the aqueous solution for 30 seconds,
 ii. Drying the membrane with air gun at 1 bar,
 iii. Adding the organic solution for 30 seconds,
 iv. Drying the membrane with air gun at about 0.5 bar
d. The membrane with TFC layer was placed in 70° C. 15% citric acid for 4 min and then in 70° C. RO water for 2 min.

1.5: Results

TABLE 1

| Ethyl acetate | | |
| --- | --- | --- |
| Co-solvent = ethyl acetate | A LMH/bar | Rejection % |
| 0% co-solvent 0% TBP | 3.2 | 95.0 |
| 0% co-solvent 1.25% TBP | 6.1 | 95.1 |
| 0.5% co-solvent 0% TBP | 6.0 | 97.6 |
| 0.5% co-solvent 1.25% TBP | 6.8 | 95.3 |
| 1.0% co-solvent 1.25% TBP | 7.1 | 96.6 |

TABLE 2

| Diethylether | | |
| --- | --- | --- |
| Co-solvent = diethylether | A LMH/bar | Rejection % |
| 0% co-solvent 0% TBP | 3.2 | 95.0 |
| 0% co-solvent 1.25% TBP | 6.1 | 95.1 |
| 0.5% co-solvent 0% TBP | 5.6 | 98.0 |
| 0.5% co-solvent 1.25% TBP | 7.2 | 97.8 |
| 1.0% co-solvent 1.25% TBP | 7.6 | 96.7 |
| 2.0% co-solvent 1.25% TBP | 8.5 | 95.4 |

TABLE 3

| Ethyl formate | | |
| --- | --- | --- |
| Co-solvent = ethyl formate | A LMH/bar | Rejection % |
| 0% co-solvent 0% TBP | 3.2 | 95.0 |
| 0% co-solvent 1.25% TBP | 6.1 | 95.1 |
| 0.5% co-solvent 0% TBP | 5.7 | 96.4 |
| 0.5% co-solvent 1.25% TBP | 7.1 | 95.0 |
| 1.0% co-solvent 1.25% TBP | 7.8 | 94.1 |

The results show that the addition of either a co-solvent or TBP in a concentration of 0.5% and 1.25%, respectively, increases the flux considerably from 3.2 LMH/bar to 5.6-6.1 LMH/bar. However, when the co-solvents and TBP at the same concentration are used together the combined effect is increased to 6.8-7.2 LMH/bar. The results also show that the flux can be further improved by adding more co-solvent to the mixture. Thus, when the co-solvent concentration is increased to 1.0% and the TBP concentration is maintained at 1.25%, the flux is increased for all co-solvents tested, with a flux value in the range of 7.1-7.8 LMH/bar. Same Example 2

The experiments reported in example 1 was repeated, however, choosing the co-solvents as (3,3,3-trifluoropropyl) trichloro-silane (TFPTCS) and adjusting the amount of TMC in accordance with the amount of TBP. The results are indicated in table 4 below:

TABLE 4

| TFPTCS | | |
| --- | --- | --- |
| Co-solvent = TFPTCS | A LMH/bar | Rejection % |
| 0% co-solvent 1% TBP 0.15% TMC | 3.73 | 77% |
| 0.01% co-solvent 1% TBP 0.15% TMC | 5.97 | 95% |
| 0.02% co-solvent 1% TBP 0.15% TMC | 6.87 | 95% |
| 0% co-solvent 0.6% TBP 0.12% TMC | 5.27 | 96% |
| 0.01% co-solvent 0.6% TBP 0.12% TMC | 6.53 | 95% |
| 0.02% co-solvent 0.6% TBP 0.12% TMC | 6.90 | 96% |

The results show that the addition of TFPTCS to an organic phase already containing TBP potentiates the effect in a concentration depend manner.

Example 3

The experiments reported in example 1 was repeated, however, choosing the co-solvents as mesitylene. The amount of TMC was as 0.15% as indicated in example 1.4 above. The results are indicated in table 5 below:

TABLE 5

| Mesitylene | | |
|---|---|---|
| Co-solvent = mesitylene | A LMH/bar | Rejection % |
| 0.5% co-solvent 0% TBP | 2.68 | 89 |
| 0.5% co-solvent 1% TBP | 6.17 | 94.9 |
| 1% co-solvent 1% TBP | 6.53 | 97.6 |
| 2% co-solvent 1% TBP | 6.50 | 97.1 |
| 4% co-solvent 1% TBP | 7.58 | 96.7 |

The results show that the addition of mesitylene to an organic phase already containing TBP potentiates the effect in a concentration dependent manner.

The invention claimed is:

1. A process for preparing a semi-permeable membrane, comprising the steps of:
    a. providing an aqueous phase comprising a polyfunctional amine monomer and vesicles comprising aquaporin proteins,
    b. covering a surface of a porous support membrane with the aqueous phase,
    c. applying an organic phase comprising a polyfunctional acyl halide monomer, a phosphorous containing compound and a co-solvent in a non-polar solvent, and
    d. allowing the polyfunctional amine monomer and the polyfunctional acyl halide monomer to perform an interfacial polymerization reaction to form a polyamide thin film composite layer,
wherein the co-solvent to phosphorous containing compound ratio is within the range from approximately 1:2.5 to approximately 4:1.

2. The process for preparing a semi-permeable membrane according to claim 1, wherein the co-solvent is represented by the formula $R^1$—O—$R^2$, wherein
    $R^1$ is selected from the group comprising a straight or branched $C_1$-$C_6$ lower alkyl, $C_1$-$C_6$ lower alkenyl or $C_1$-$C_6$ lower alkynyl, optionally substituted with 1 to 3 substituents independently selected among the group consisting of methyl, ethyl, propyl, fluor, chlorine, bromine, iodine, hydroxy, aldehyde, carboxylic acid, amine, amide, nitril, methoxy, ethoxy, propoxy, isopropoxy, and any combination thereof, and
    $R^2$ is selected from a group comprising a straight or branched $C_1$-$C_6$ lower alkyl, $C_1$-$C_6$ lower alkenyl, $C_1$-$C_6$ lower alkynyl, carbonyl $C_1$-$C_6$ lower alkyl, carbonyl $C_1$-$C_6$ lower alkenyl, carbonyl $C_1$-$C_6$ lower alkynyl, optionally substituted with 1 to 3 substituents selected among the group consisting of methyl, ethyl or propyl, flour, chlorine, bromine, iodine, hydroxy, aldehyde, carboxylic acid, amine, amide, nitril, methoxy, ethoxy, propoxy, isopropoxy, and any combination thereof.

3. The process for preparing a semi-permeable membrane according to claim 1, wherein $R^1$ is $C_1$-$C_6$ lower alkyl and $R^2$ is $C_1$-$C_6$ lower alkyl or carbonyl $C_1$-$C_6$ lower alkyl.

4. The process for preparing a semi-permeable membrane according to claim 1, wherein the co-solvent is selected from the group consisting of ethyl formate, ethyl acetate, and diethyl ether.

5. The process for preparing a semi-permeable membrane according to claim 4, wherein when the co-solvent is either ethyl acetate or ethyl formate, the co-solvent to phosphorous containing compound ratio is within the range from 1:2.5 to 2:2.5, and wherein when the co-solvent is diethyl ether, said ratio is within the range from 1:2.5 to 2:1.25.

6. The process for preparing a semi-permeable membrane according to claim 1, wherein the co-solvent is a silane or an aromatic compound.

7. The process for preparing a semi-permeable membrane according to claim 6, wherein the silane is represented by the general formula $X_3$—Si—$R^1$, in which X is a halogen independently selected amount the group consisting of F, Cl, Br, and I, and $R^1$ is as defined above.

8. The process for preparing a semi-permeable membrane according to claim 7, wherein the $R^1$ is trifluoro $C_1$-$C_6$-alkyl, such as trifluoropropyl.

9. The process for preparing a semi-permeable membrane according to claim 6, wherein the aromatic compound comprises a benzene ring optionally substituted with 1 to 6 substituents selected among the group consisting of methyl, ethyl, propyl, flour, chlorine, bromine, iodine, hydroxy, aldehyde, carboxylic acid, amine, amide, nitril, methoxy, ethoxy, propoxy, isopropoxy, and any combination thereof or wherein the aromatic compound is mesitylene.

10. The process for preparing a semi-permeable membrane according to claim 1, wherein the phosphorous containing compound is reacted with the polyfunctional acyl halide prior to the step of reacting the polyfunctional acyl halide and the polyfunctional amine.

11. The process for preparing a semi-permeable membrane according to claim 1, wherein the phosphorous containing compound has an energy of interaction with the polyfunctional acyl halide of greater than about 4.0 kcal/mol.

12. The process for preparing a semi-permeable membrane according to claim 1, wherein the phosphorous containing compound comprises at least one of: phosphates, phosphites, phosphines, phosphine oxides, phosphonates, diphosphonates, phosphinates, phosphinites, phosphonites, pyrophosphates, pyrophosphoramides, phosphor amides, phosphorothionates, phosphorodithionates, and phosphoroamido thionates.

13. The process for preparing a semi-permeable membrane according to claim 1, wherein the phosphorous containing compound is represented by the formula:

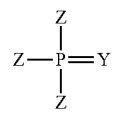

in which Z is the same or different and is selected from: $R^2$, O—P—$(R^2)_2$, P(O)—$X_2$, (P(—$R^2$))$_m$—P—$X_2$, (O—P(—$R^2$))$_m$—O—P—$R^2{}_2$, (P(O)(—$R^2$))$_m$—P(O)—$R^2{}_2$, and (O—P(O)(—$R^2$))$_m$—O—P(O)—$R^2{}_2$; P is phosphorous, O is oxygen, m is an integer from 1 to 5; Y is O or a non-bonded pair of electrons, $R^2$ is as defined above, X is the same or different and selected from: $R^3$ and $R^3$—O, $R^3$ being the same or different and selected from H (hydrogen), and a carbon containing moiety independently selected among $R^2$ groups.

14. The process for preparing a semi-permeable membrane according to claim 1, wherein the phosphorous containing compound is elected among the group comprising tri-methyl phosphate, tri-ethyl phosphate, tri-butyl phosphate, di-butyl phosphite, bis(2-ethyl hexyl) phosphite, tri-phenyl phosphine, tri-phenyl phosphate, tri-phenyl phosphine, tributyl phosphate, di-tert-butyl diisopropyl phosphoramidite, dibutylbutyl phosphonate, and tri-octyl phosphine.

15. The process for preparing a semi-permeable membrane according to claim 1, wherein the concentration of the co-solvent in the organic phase is 0.005% to 5%, such as 0.2% to 5%.

16. The process for preparing a semi-permeable membrane according to claim 1, wherein the main solvent of the organic phase comprises linear or branched $C_5$-$C_{12}$ alkanes.

17. The process for preparing a semi-permeable membrane according to claim 16, wherein the vesicles comprises poly-block-(2-methyloxazoline)-poly-block-(dimethylsiloxane) (PMOXA-PDMS) and amine functionalized poly (dimethylsiloxane) as vesicle membrane forming materials.

18. The process for preparing a semi-permeable membrane according to claim 1, wherein support membrane comprises polysulfone or a polyethersulfone polymer.

19. The process according to claim 1, wherein the porous support membrane is a hollow fiber or a flat sheet.

20. The process according to claim 1, comprising the further step of producing a hollow fiber module by assembling a bundle of hollow fibers in a housing, wherein an inlet for passing a first solution is connected to the lumen of the hollow fibers in one end and an outlet is connected to the lumen in the other end, and an inlet is provided in the housing for passing a second solution to an outlet connected to the housing or wherein when the porous support membrane is a flat sheet, the process further comprises the step of producing a spiral wound module by winding the flat sheet membrane.

\* \* \* \* \*